United States Patent [19]
Harvey

[11] Patent Number: 5,249,259
[45] Date of Patent: Sep. 28, 1993

[54] GENETIC ALGORITHM TECHNIQUE FOR DESIGNING NEURAL NETWORKS

[75] Inventor: Robert L. Harvey, Lexington, Mass.

[73] Assignee: Massachusetts Institute of Technology, Cambridge, Mass.

[21] Appl. No.: 892,401

[22] Filed: May 28, 1992

Related U.S. Application Data

[63] Continuation of Ser. No. 468,857, Jan. 23, 1990, abandoned.

[51] Int. Cl.$^5$ ............................................. G06F 15/18
[52] U.S. Cl. ........................................ 395/13; 395/23
[58] Field of Search ........................ 395/13, 24, 27, 23

[56] References Cited

U.S. PATENT DOCUMENTS

| | | | |
|---|---|---|---|
| 4,697,242 | 9/1987 | Holland et al. | 364/513 |
| 4,881,178 | 11/1989 | Holland et al. | 364/513 |
| 4,935,877 | 6/1990 | Koza | 364/513 |
| 4,972,363 | 11/1990 | Nguyen et al. | 395/24 |
| 5,119,469 | 6/1992 | Alkon et al. | 395/23 |
| 5,140,530 | 8/1992 | Guha et al. | 395/24 |
| 5,155,802 | 10/1992 | Mueller et al. | 395/24 |

OTHER PUBLICATIONS

Symbolic Schemata in Connectionist Memories: Role Binding and the Evolution of Structure; Technical Report UCLA-AI-87-11; Dolan and Dyer; pp. 1-23; Apr. 1987.
Designing Neural Networks using Genetic Algorithms; International Conference on Genetic Algorithms, ICGA '89, George Mason University, Fairfax, Va.; Miller, Todd, and Hedge; pp. 379-384; Jun. 4-7, 1989.
Towards the Genetic Sythesis of Neural Networks; International Conference on Genetic Algorithms, ICGA '89, George Mason University, Fairfax, Va.; Harp, Samad, and Guha; pp. 360-369; Jun. 4-7, 1989.
Training Feedforward Neural Networks Using Genetic Algorithms; International Joint Conference on Artificial Intelligence, IJCAI '89, Machine Learning; Montana and Davis; pp. 763-767; Aug. 20-25, 1989.
Applying Genetic Algorithms to Neural Network Learning; Proceedings of the Seventh Conference of the Society for the Study of Artificial Intelligence and Simulation of Behavior; Whitley; pp. 137-144; Apr. 1989.
Parametric Connectivity: Feasibility of Learning in Constrained Weight Space; T. Caudell; IJCNN; Jun. 18-22, 1989; vol. 1; pp. 667-675.
Calibration of Neural Networks Using Genetic Algorithms, with Application to Optimal Path Planing; Smith et al.; First Annual Workshop on Space Operations, Automation, and Robotics (SOAR '89); Aug. 5-7, 1987; pp. 519-526.
Schaffer et al., "Using Genetic Search to Exploit the Emergent Behavior of Neural Networks", *Physica D*, vol. 42, Jun. 1990, Nos. 1-3, pp. 244-248.
Montana et al., "Training Feedforward Neural Networks Using Genetic Algorithms", IJCAI-89, Proceedings of The Eleventh International Joint Conference on Artificial Intelligence, vol. 1, Aug. 20-25, 1989.
L. Davis and S. Coombs, "Genetic Algorithms and (List continued on next page.)

*Primary Examiner*—Allen R. MacDonald
*Attorney, Agent, or Firm*—Fish & Richardson

[57] ABSTRACT

A generic algorithm search is applied to determine an optimum set of values (e.g., interconnection weights in a neural network), each value being associated with a pair of elements drawn from a universe of N elements, N an integer greater than zero, where the utility of any possible set of said values may be measured. An initial possible set of values is assembled, the values being organized in a matrix whose rows and columns correspond to the elements. A genetic algorithm operator is applied to generate successor matrices from said matrix. Matrix computations are performed on the successor matrices to generate measures of the relative utilities of the successor matrices. A surviving matrix is selected from the successor matrices on the basis of the metrics. The steps are repeated until the metric of the surviving matrix is satisfactory.

15 Claims, 26 Drawing Sheets

OTHER PUBLICATIONS

Communication Link Design: Theoretical Considerations", Proc. Second Int. Conf. on Genetic Algorithms and Their Applications, Jul. 28-31, 1987, (pp. 252-260).

S. Coombs and L. Davis, "Genetic Algorithms and Communication Link Speed Design: Constraints and Operators", Proc. Second Int. Conf. on Genetic Algorithms and Their Applications, Jul. 28-31, 1987, (pp. 257-260).

Smith et al., "Calibration of Neural Networks Using Genetic Algorithms, with Application to Optical Path Planning", NASA Conference Publication 2491, Aug. 5-7, 1987, pp. 519-526.

Grossberg, "Nonlinear Neural Networks: Principles, Mechanisms, and Architectures", *Neural Networks*, vol. 1, pp. 17-61, 1988.

McClelland et al., "Explorations in the Microstructure of Cognition", *Parallel Distributed Processing*, pp. 333-371, 1988.

Holland, "Adaption in Natural and Artificial Systems", ISBN 0-472-08460-7, Oct. 11, 1988, pp. v-vii.

Adomian, "A Global Method for Solution of Complex Systems", *Mathematical Modelling*, vol. 5, pp. 251-263, 1984.

Deimling, "Nonlinear Functional Analysis", Index, AMS Subject Classification, 1980.

De Jong, "On Using Genetic Algorithms to Search Program Spaces", Computer Science Department, George Mason University, pp. 210-216.

Bickel et al., "Tree Structured Rules in Genetic Algorithms", Abstract, Department of Compute and Information Systems, Florida Atlantic University.

Booker et al., "Classifier Systems and Genetic Algorithms", Elsevier Science Publishers B.V., 1989, pp. 235-282.

Dolan et al., "Towards the Evolution of Symbols", UCLA AI Laboratory, pp. 123-131.

Schaffer et al., "An Adaptive Crossover Distribution Mechanism for Genetic Algorithms", Philips Laboratories, North American Philips Corporation, Briarcliff Manor, New York, pp. 36-58.

Fujiki et al., "Using the Genetic Algorithm to Generate LISP Source Code to Solve the Prisoner's Dilemma", Department of Computer Science, University of Idaho, Moscow, Id., pp. 236-240.

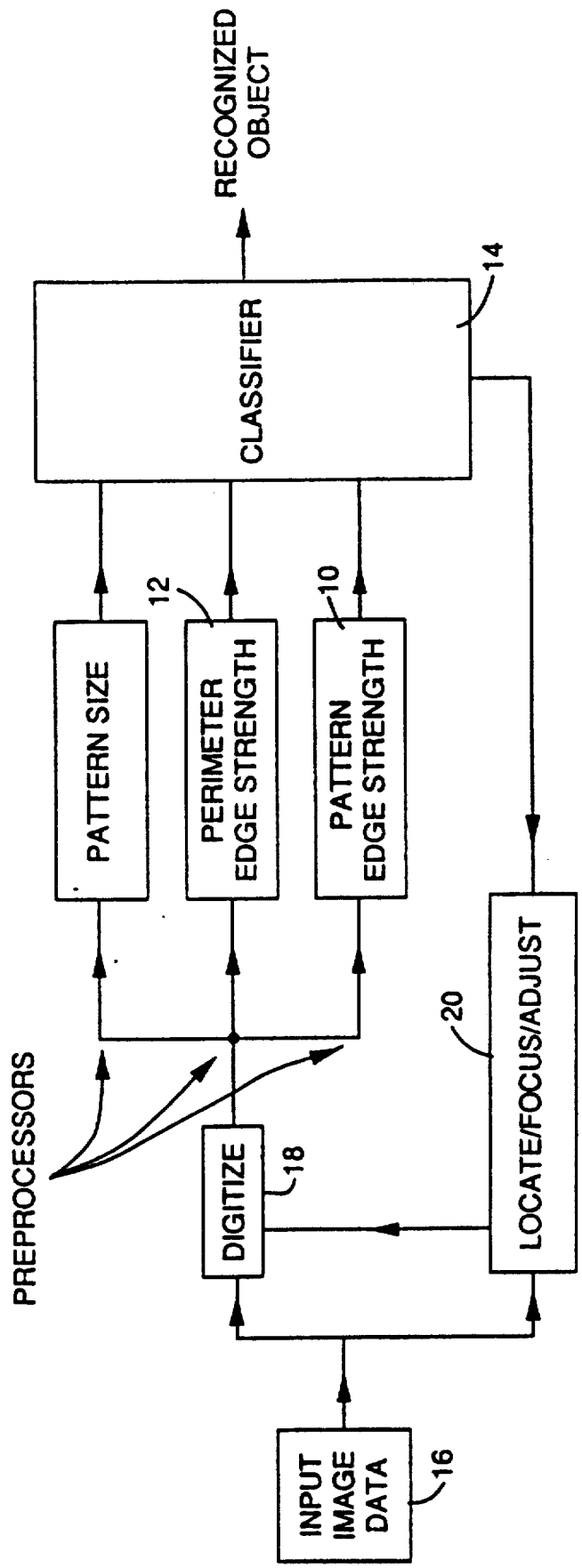

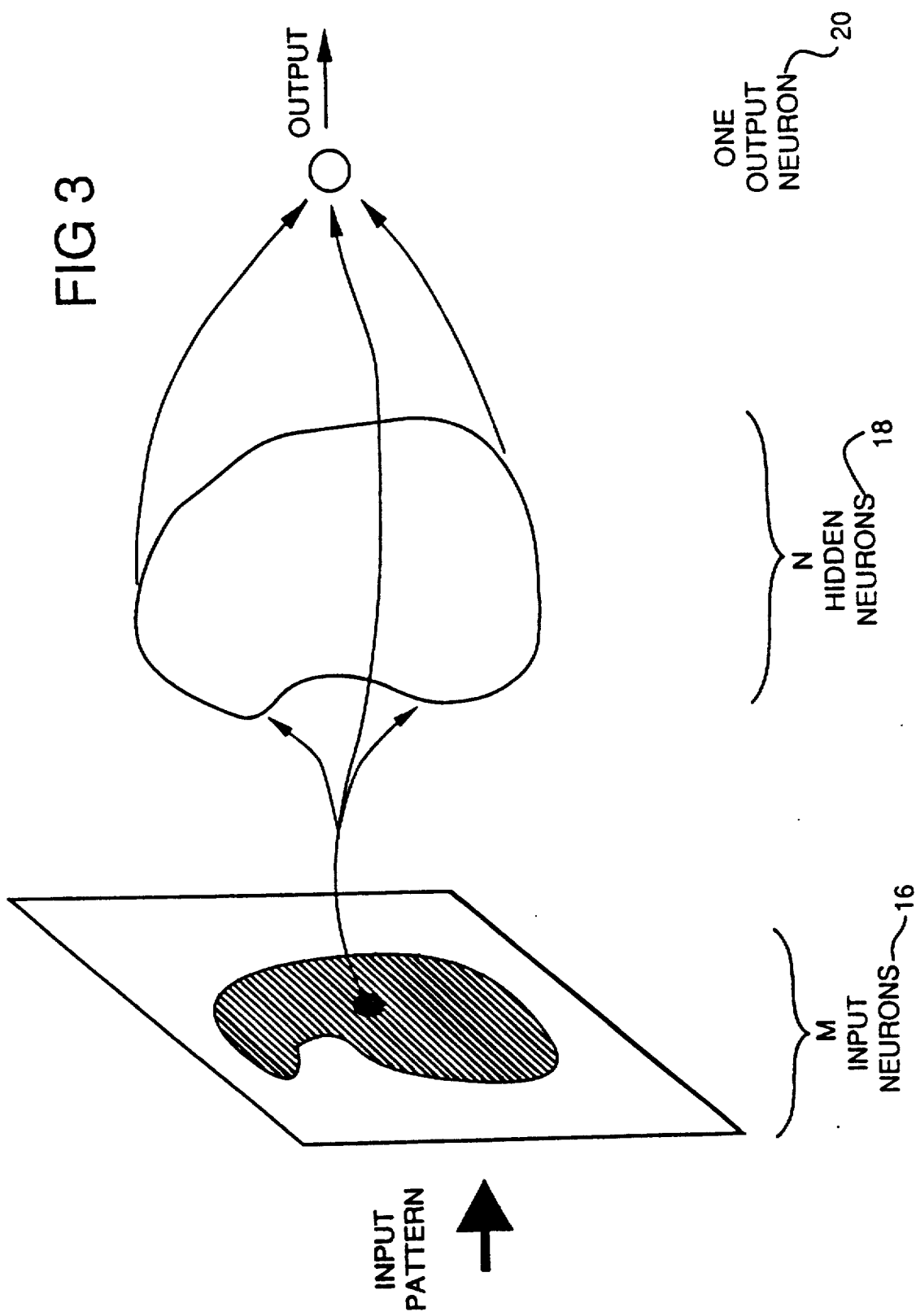

FIG 5A $$\frac{dx_i}{dt} = -\alpha x_i + \sum_j Z_{ji} f(x_j) + I_{ij} \qquad (1)$$

WHERE $x_i$ = activation of the i-th neuron $Z_{ji}$ = long-term memory (LTM) trace from the j-th neuron to the i-th neuron, $I_i$ = external input to the i-th neuron, $f()$ = a sigmoid function, $\alpha$ = constant scalar.

INPUT NEURONS:

$$\frac{dx_i}{dt} = -\alpha x_i + I_i, \; i = 1, \ldots, M. \qquad (2)$$

HIDDEN NEURONS:

$$\frac{dx_i}{dt} = -\alpha x_i + \sum_{j=1}^{M+N} Z_{ji} f(x_j), \; i = 1, \ldots, N. \qquad (3)$$

OUTPUT NEURONS:

$$\frac{dx_o}{dt} = -\alpha x_o + \sum_{j=1}^{M+N} Z_{jo} f(x_j). \qquad (4)$$

$$\frac{dx_i}{dt} = -\alpha x_i + \sum_{j=1}^{N} Z_{ji} f(x_j) + \sum_{k=1}^{M} Z'_{ki} f(x_k) \qquad (5)$$

WHERE $Z_{ji}$ = LTM trace within the hidden system, $Z'_{ki}$ = LTM trace from the input-to-hidden system.

assume $\alpha = 1$.

$$x_i = \sum_{j=1}^{N} Z_{ji} f(x_j) + \sum_{k=1}^{M} Z'_{ki} f(I_k), \; i = 1, \ldots, N. \qquad (6)$$

FIG 5B $$X = \begin{bmatrix} x_1 \\ \cdot \\ \cdot \\ \cdot \\ x_N \end{bmatrix}_{N \times 1} \quad (7)$$

$$\underbrace{X}_{N \times 1} = \underbrace{A}_{N \times N} \underbrace{f(X)}_{N \times 1} + \underbrace{B}_{N \times M} \underbrace{f(I)}_{M \times 1} \quad (8)$$

where $$A = [Z_{ji}]_{N \times N}$$

and $$B = [Z'_{ki}]_{N \times M}$$

$$Z = x_0(\infty)$$

$$Z = \sum_{j=1}^{N} Z_{jo} f(x_j) + \sum_{k=1}^{M} Z'_{ko} f(I_k), \quad (9)$$

giving $$\underbrace{Z}_{1 \times 1} = \underbrace{C}_{1 \times N} \underbrace{f(X)}_{N \times 1} + \underbrace{D}_{1 \times M} \underbrace{f(I)}_{M \times 1} \quad (10)$$

$$d = \sum_{i=1}^{N_P} (T L O_i \leq Z_i \leq T H I_i), \quad (11)$$

where $Z_i$ = output bound for the i-th input pattern, $TLO_i$ = lower bound for the i-th input pattern,
$THI_i$ = upper bound fot the i-th input pattern and $$(T L O_i \leq Z_i \leq T H I_i) = \begin{cases} 0 \text{ if } TLO_i \leq Z_i \text{ and } Z_i \leq THI_i \\ 1 \text{ otherwise} \end{cases} \quad (12)$$

FIG 5C

$$\alpha = \sum_{i=1}^{N_1}(Z_i \geq T_i) + \sum_{j=1}^{N_2}(Z_j \leq T_j). \tag{13}$$

where $T_i$ = selection thereshold and $$(Z_i \geq T_i) = \begin{cases} 0 \text{ if } Z_i \geq T_i \\ 1 \text{ otherwise} \end{cases} \tag{14}$$

similarly for $(Z_i \leq T_i)$ $$0 \leq d \leq N_P. \tag{15}$$

$$X = A f(X) = B f(I) \tag{16}$$

$$X_o = B f(I) \tag{17}$$

$$X_1 = A X_o + X_o \tag{18}$$

The recursion is:

$$X(+) + A f(X(-)) + B f(I) \tag{19}$$

$$NG \alpha N^\alpha NC^\beta \tag{20}$$

where

NG = number of generations,

N = number of hidden generstions,

NC = number of copies per generation.

$$X = A f_1(X) + B f_2(I) \qquad (21)$$

$$Z = C f_1(X) + D f_2(I) \qquad (22)$$

$$f_2(X) = \begin{cases} 0, & X < 0 \\ X, & 0 \leq X \leq 1 \\ 1, & X > 1. \end{cases} \qquad (23)$$

FIG 5D

MATRIX A $$\begin{matrix} Z_{EE} & Z_{EF} & Z_{EG} & Z_{EH} & Z_{EI} & Z_{EJ} \\ Z_{FE} & Z_{FF} & Z_{FG} & Z_{FH} & Z_{FI} & Z_{FJ} \\ Z_{GE} & Z_{GF} & Z_{GG} & Z_{GH} & Z_{GI} & Z_{GJ} \\ Z_{HE} & Z_{HF} & Z_{HG} & Z_{HH} & Z_{HI} & Z_{HJ} \\ Z_{IE} & Z_{IF} & Z_{IG} & Z_{IH} & Z_{II} & Z_{IJ} \\ Z_{JE} & Z_{JF} & Z_{JG} & Z_{JH} & Z_{JI} & Z_{JJ} \end{matrix}$$

MATRIX B $$\begin{matrix} Z_{EA} & Z_{EB} & Z_{EC} & Z_{ED} \\ Z_{FA} & Z_{FB} & Z_{FC} & Z_{FD} \\ Z_{GA} & Z_{GB} & Z_{GC} & Z_{GD} \\ Z_{HA} & Z_{HB} & Z_{HC} & Z_{HD} \\ Z_{IA} & Z_{IB} & Z_{IC} & Z_{ID} \\ Z_{JA} & Z_{JB} & Z_{JC} & Z_{JD} \end{matrix}$$

FIG 6A

MATRIX C $Z_{OE}$  $Z_{OF}$  $Z_{OG}$  $Z_{OH}$  $Z_{OI}$  $Z_{OJ}$

MATRIX D $Z_{OA}$  $Z_{OB}$  $Z_{OC}$  $Z_{OD}$

FIG 6B

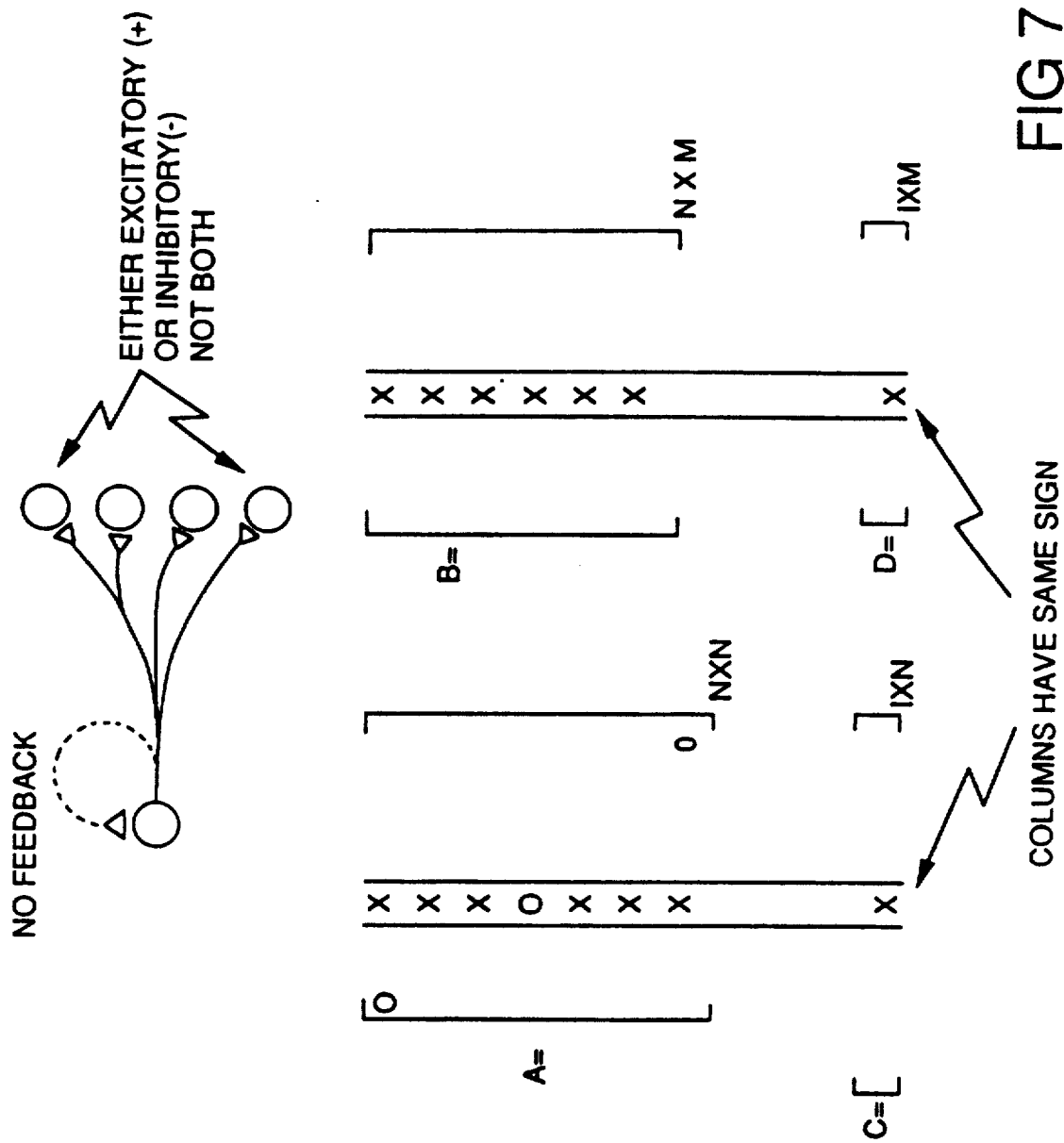

FIG 9

PATTERN 1
```
0 0 0 0 0 0 0
0 0 0 0 0 0 0
0 0 0 0 0 0 0
1 1 1 1 1 1 1
0 0 0 0 0 0 0
0 0 0 0 0 0 0
0 0 0 0 0 0 0
```

2
```
0 0 0 0 0 0 0
0 0 0 0 0 0 0
0 0 0 0 0 0 0
0 1 1 1 1 1 0
0 0 0 0 0 0 0
0 0 0 0 0 0 0
0 0 0 0 0 0 0
```

3
```
0 0 0 0 0 0 0
0 0 0 0 0 0 0
0 0 0 0 0 0 0
0 0 1 1 1 0 0
0 0 0 0 0 0 0
0 0 0 0 0 0 0
0 0 0 0 0 0 0
```

HIGH RESPONSE
50 ≤ OUTPUT Z ≤ 100

4
```
0 0 0 0 0 0 1
0 0 0 0 0 1 0
0 0 0 0 1 0 0
0 0 0 1 0 0 0
0 0 1 0 0 0 0
0 1 0 0 0 0 0
1 0 0 0 0 0 0
```

5
```
0 0 0 0 0 0 0
0 0 0 0 0 1 0
0 0 0 0 1 0 0
0 0 0 1 0 0 0
0 0 1 0 0 0 0
0 1 0 0 0 0 0
0 0 0 0 0 0 0
```

6
```
0 0 0 0 0 0 0
0 0 0 0 0 0 0
0 0 0 0 1 0 0
0 0 0 1 0 0 0
0 0 1 0 0 0 0
0 0 0 0 0 0 0
0 0 0 0 0 0 0
```

LOW RESPONSE
-100 ≤ OUTPUT Z ≤ 10

7
```
0 0 0 1 0 0 0
0 0 0 1 0 0 0
0 0 0 1 0 0 0
0 0 0 1 0 0 0
0 0 0 1 0 0 0
0 0 0 1 0 0 0
0 0 0 1 0 0 0
```

8
```
0 0 0 0 0 0 0
0 0 0 1 0 0 0
0 0 0 1 0 0 0
0 0 0 1 0 0 0
0 0 0 1 0 0 0
0 0 0 1 0 0 0
0 0 0 0 0 0 0
```

9
```
0 0 0 0 0 0 0
0 0 0 0 0 0 0
0 0 0 1 0 0 0
0 0 0 1 0 0 0
0 0 0 1 0 0 0
0 0 0 0 0 0 0
0 0 0 0 0 0 0
```

LOW RESPONSE
-100 ≤ OUTPUT Z ≤ 10

10
```
1 0 0 0 0 0 0
0 1 0 0 0 0 0
0 0 1 0 0 0 0
0 0 0 1 0 0 0
0 0 0 0 1 0 0
0 0 0 0 0 1 0
0 0 0 0 0 0 1
```

11
```
0 0 0 0 0 0 0
0 1 0 0 0 0 0
0 0 1 0 0 0 0
0 0 0 1 0 0 0
0 0 0 0 1 0 0
0 0 0 0 0 1 0
0 0 0 0 0 0 0
```

12
```
0 0 0 0 0 0 0
0 0 0 0 0 0 0
0 0 1 0 0 0 0
0 0 0 1 0 0 0
0 0 0 0 1 0 0
0 0 0 0 0 0 0
0 0 0 0 0 0 0
```

LOW RESPONSE
-100 ≤ OUTPUT Z ≤ 10

FIG. 12a

FINAL A MATRIX SIZE = 25 × 25

FIG. 12b

FINAL B MATRIX : SIZE = 25 X 49

FIG. 12c

FINAL B MATRIX CONTINUED

C: -7 -9 -6 -10 -9 -9 -5 -4 -7 0 -5 -9 -6 -9 -8 -9 -2 -6 -10 -5 -1 -4 -9 -1 -5

D: 0 100 80 30 60 70 10 20 50 40 10 30 40 10 0 40 20 30 30 30 40 30 80 40
90 10 50 30 20 0 10 30 0 30 80 20 70 30 60 0 40 0 80 0 30 30 30 90 10

Final C Matrix: Size = 1 x 25

Final D Matrix: Size = 1 x 49

FIG. 12d

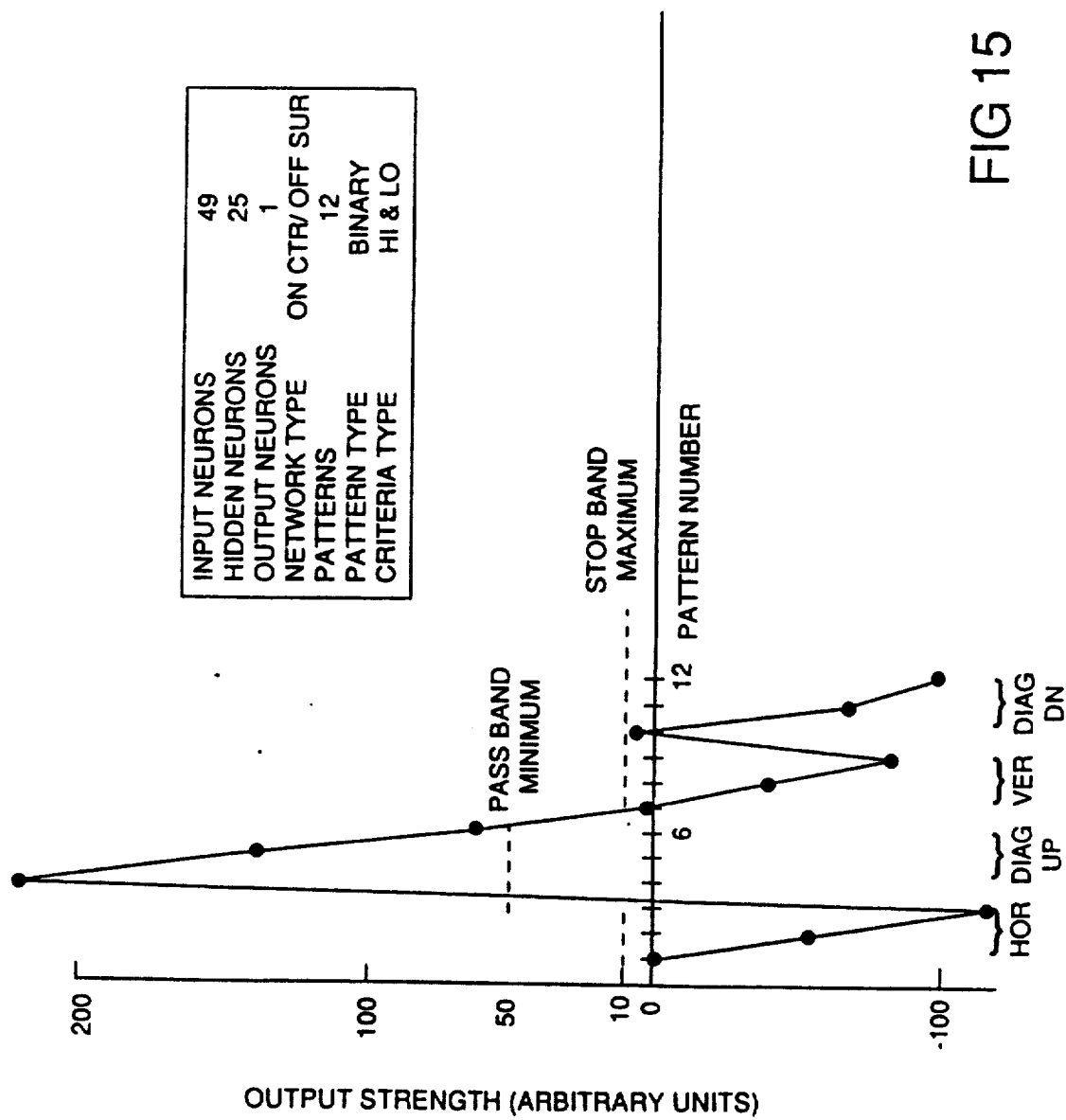

FIG. 16a

FINAL A MATRIX SIZE=25x25

FIG. 16b

FINAL B MATRIX SIZE=25x49

FIG. 16c

FINAL B MATRIX CONTINUED

C: -2 -8 -7 -8 -6 -2 -4 -1 -2 -2 -1 -10 -9 -5 -8 -1 -9 -6 0 -7 -9 -6 -8 -9 -2

D: 50 70 0 0 70 0 60 0 10 80 0 70 30 90 0 40 0 10100 20 50 0 50 0
    10 10 60 80 70 80 40 30 80 20 80 60 40 40 70 30 50 50 90 0 40 90 80 10

FINAL C MATRIX SIZE = 1x25
FINAL D MATRIX = 1x49

FIG. 16d

GENETIC ALGORITHM TECHNIQUE FOR DESIGNING NEURAL NETWORKS

This is a continuation of application Ser. No. 07/468,857, filed Jan. 23, 1990, now abandoned.

BACKGROUND OF THE INVENTION

The invention relates to genetic algorithms, and to the use of genetic algorithms in designing neural networks (NNs).

One aspect of NN design is the specification of the interconnections among a NN's neurons to achieve a desired input-output (I/O) relationship. In particular, for the class of long term memory (LTM) time invariant NNs, the NN is programmed for a particular I/O relationship by choosing the weight of each interconnecting trace between a pair of neurons.

Conventional NN design techniques make simplifying assumptions so that the problem of determining the trace weights is tractable. Examples of these simplifying assumptions are that the neurons are arranged in layers within which no lateral connections are made or that a neuron can be simultaneously excitatory and inhibitory, i.e., the weights of traces from a particular neuron to others in the NN can be positive to some and negative to others.

SUMMARY OF THE INVENTION

In general, the invention features applying, in a program controlled computer, a genetic algorithm search to determine an optimimum set of values, each value being associated with a pair of elements drawn from a universe of N elements, N an integer greater than zero, where the utility of any possible set of said values may be measured. An initial possible set of values is assembled, the values being organized in a matrix whose rows and columns correspond to the elements. A genetic algorithm operator is applied to generate successor matrices from said matrix. Matrix computations are performed on the successor matrices to generate measures of the relative utilities of the successor matrices. A surviving matrix is selected from the successor matrices on the basis of the metrics. The steps are repeated until the metric of the surviving matrix is satisfactory.

Preferred embodiments of the invention include the following features. The method may be adapted for determining, for neurons of a neural network, a set of interconnection weights which will enable the network to approximate a prespecified output when presented with a predetermined set of input data. In that adaptation, the initial possible set of interconnection weights is assembled, and matrix computations are performed on the input data and on the successor matrices to generate an output of each successor matrix. A metric is computed corresponding to the difference between each generated output and the prespecified output, and the successor matrix is selected based on the metrics.

The interconnection weights in the matrices are forced to comply with constraints that correspond to the architecture of the neural network. The interconnection weights in the matrices are organized so that the interconnection weights leading to a given neuron all appear in a single row (or a single column) of each matrix, and the interconnection weights leading from a given neuron all appear in a single column (or a single row) of the matrix. The constraints include requiring that the interconnection weights between a neuron and itself be zero. The constraints also include requiring that the interconnection weights leading from a given neuron all be of the same sign. The neural network comprises a layer of input neurons, a layer of hidden neurons, and a single output neuron. The step of applying a genetic algorithm operator comprises applying a mutation operator by randomly changing a portion of the interconnection weights in a given matrix. No other genetic algorithm operator is applied, other than mutation. The interconnection weights are organized in more than one matrix based on layers of neurons in the neural network. The input data sets include binary values which represent edges of an image. The step of selecting a successor matrix on the basis of the metrics may include either testing whether a metric lies within a band between upper and lower bounds, or testing whether metrics with respect to predetermined input data sets lie above a passband or below a stopband.

Use of matrix representations enables simple and rapid design of a neural network. The meanings of the interconnection weights may be easily interpreted because of the manner in which they are arrayed in the matrix. Simplifying assumptions required in some other techniques may be avoided. Complex, fully interconnected networks an be designed for implementing user specified, input output functions.

Other advantages and features will become apparent from the following description of the preferred embodiment and from the claims.

DESCRIPTION OF THE PREFERRED EMBODIMENT

We first briefly describe the drawings.

FIG. 1 is a functional block diagram of a pattern recognition system.

FIGS. 2A, 2B, 2C, and 2D are a diagram of edges in images.

FIG. 3 is a diagram of the layers of one kind of neural network.

FIGS. 5A through 5D are equations relating to the invention.

FIGS. 6A and 6B are matrices of interconnection weights.

FIG. 7 is a diagram of constraints imposed on the interconnection weights arrayed in a matrix.

FIG. 9 is a set of input data matrices for testing the neural network.

FIGS. 12A through 12D set forth matrices of interconnection weights for a horizontal edge detector.

Figure 13:
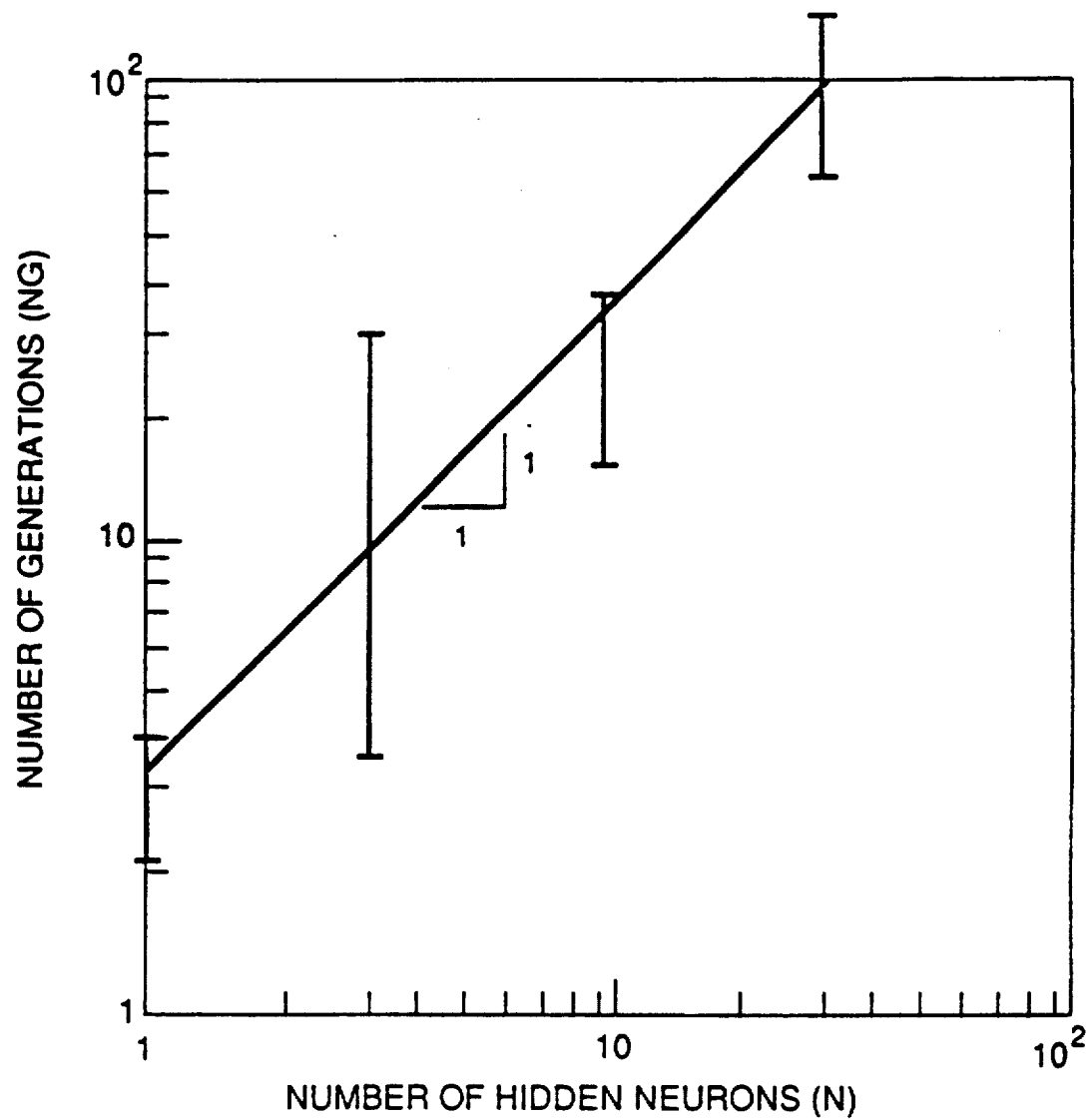

FIG. 13 is a graph of numbers of generations required for various numbers of hidden neurons.

Figure 14:
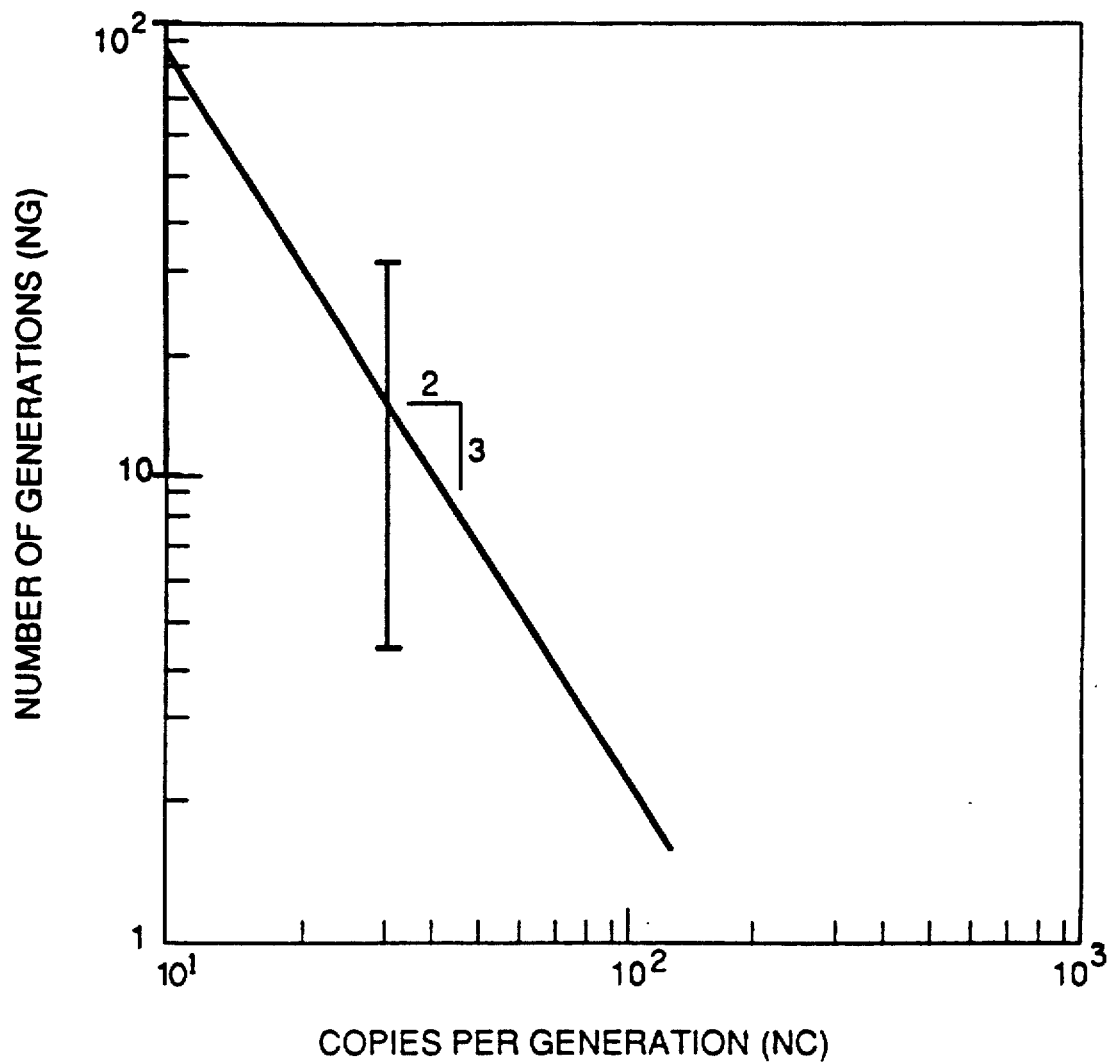

FIG. 14 is a curve of sensitivity to number of copies per generation.

FIG. 15 is a diagram of diagonal feature detector response.

Figure 16A:
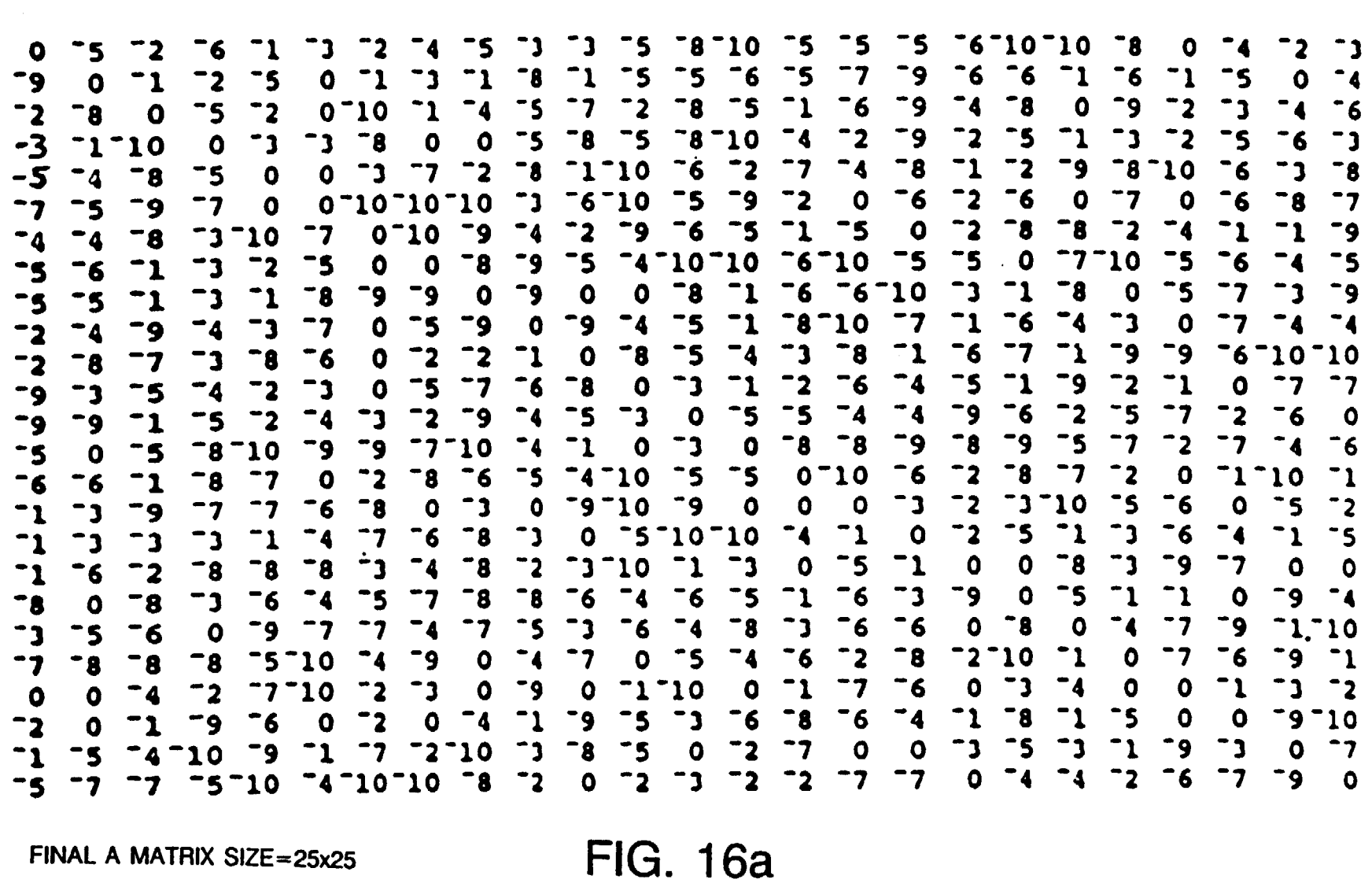
Figure 16B:
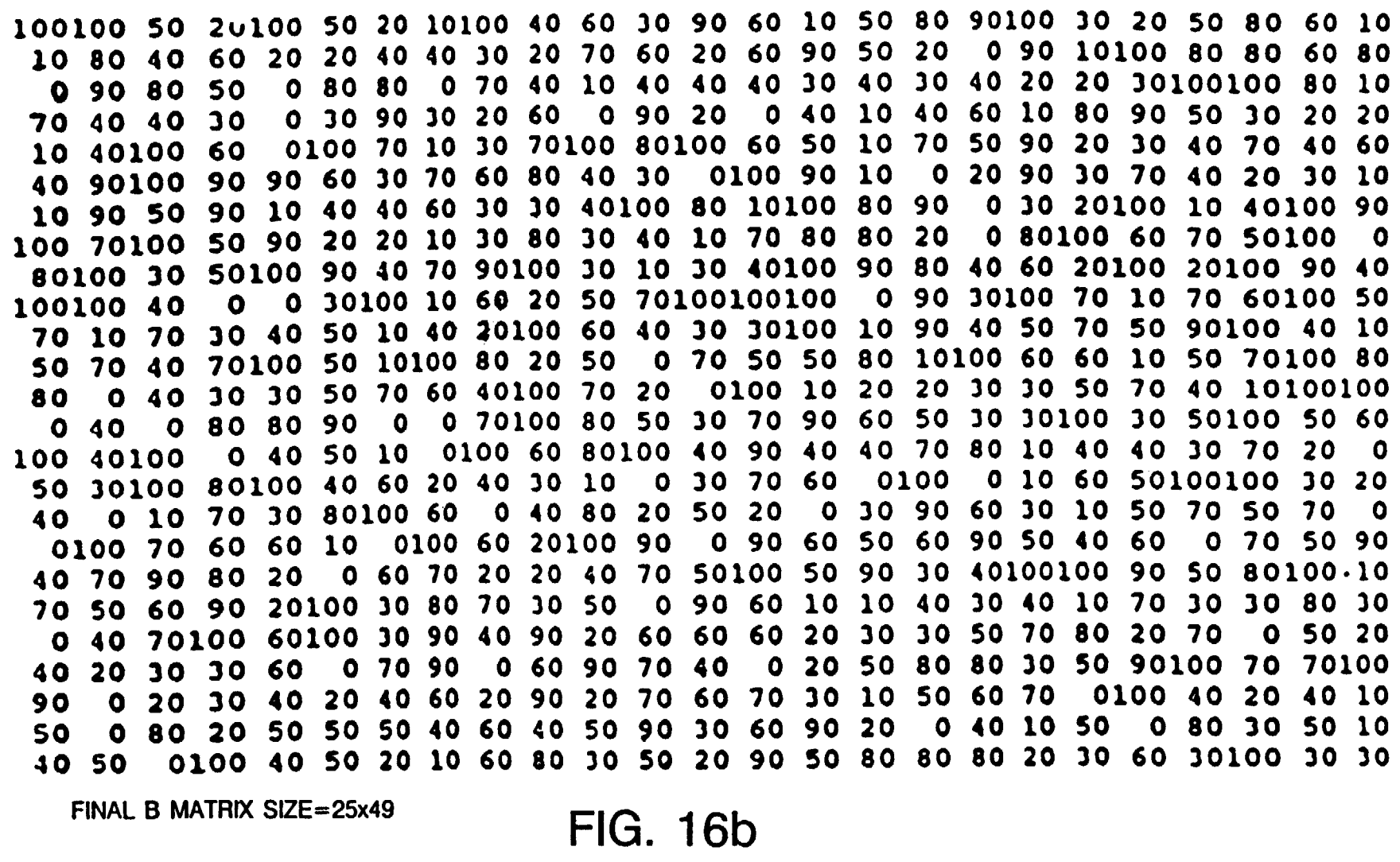
Figure 16C:
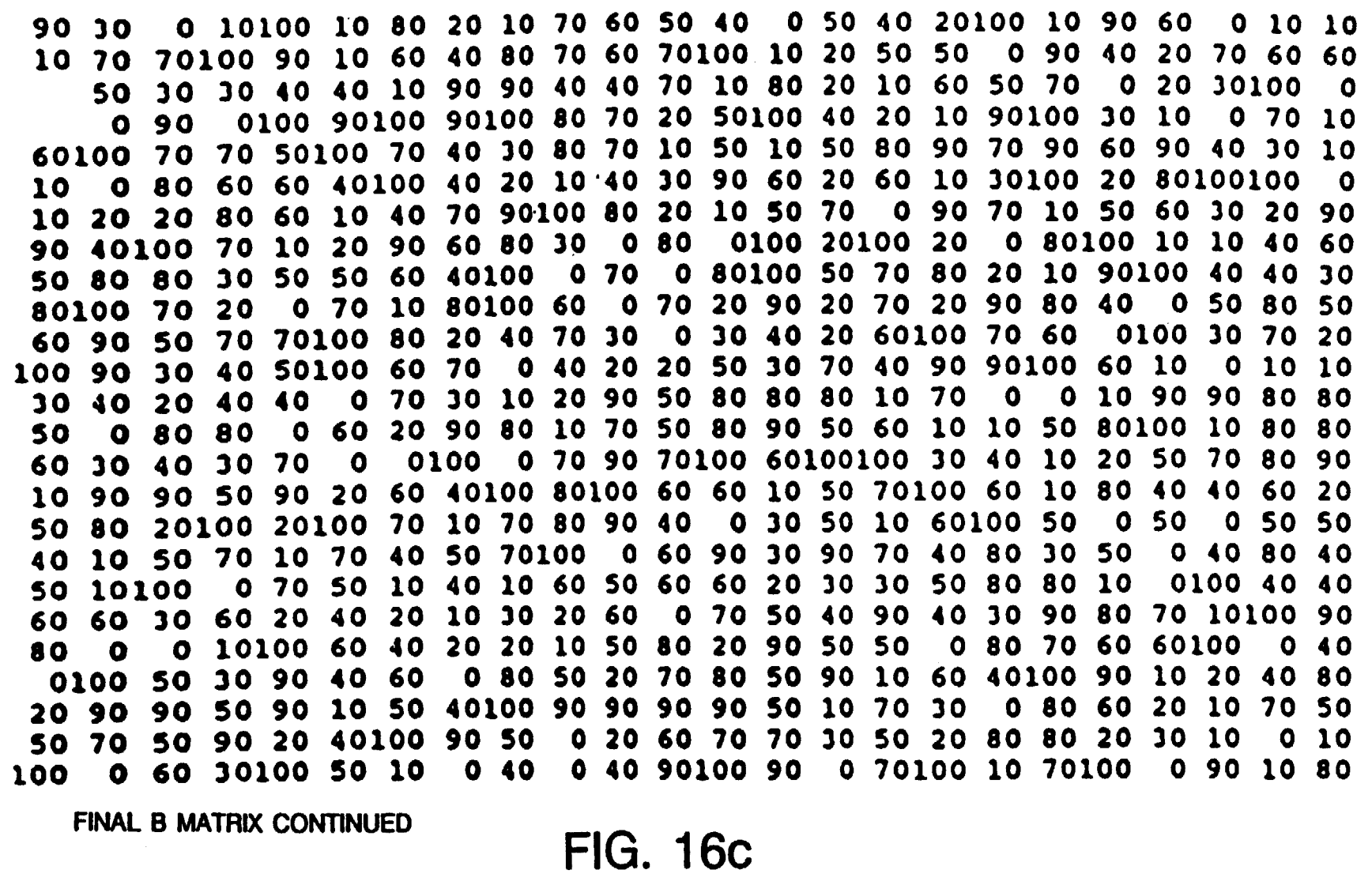

FIGS. 16A through 16D set forth matrices of interconnection weights for a diagonal edge detector.

The LTM, time-invariant class of NNs is particularly suited for applications such as preprocessors, feature detectors, and feedback control modules in larger processing systems. Referring to FIG. 1, in a pattern recognition system of the kind described in copending patent application, U.S. Ser. No. 07/784,634, filed Oct. 28, 1991, assigned to the same assignee and incorporated herein by reference, patterns of an input image are analyzed to classify objects represented by patterns within the image. The output of the system is an indication of the categories, or names, of the objects located within the input image.

Each of the modules within the system of FIG. 1 mimics a particular function of the biological vision system. The system includes a pattern edge strength module 10 and a perimeter edge strength module 12 which mimic the functions of the biological vision system's visual cortex areas called visual area 1 and visual area 2, respectively. Together, these two edge strength preprocessors provide edge strength information to the classifier module 14 for final classification of objects located within an input image.

The system of FIG. 1 also includes a digitizer unit 18 which digitizes the input image data 16, and a locate/focus/adjust unit 20 which locates patterns within the input image data 16, provides control to the digitizer unit, and receives feedback from the classifier module 14.

The pattern edge strength module 10 generates a measure of the visual strength of the edges within a pattern in the input image data 16. For binary images, the module measures the visual strength of the pattern's orientations in the horizontal, vertical, and two 45 degree diagonal directions. For gray-scale images, the module generates measures of the magnitude of the luminance gradient in the four directions. These orientation measurements of luminance lines and gradient magnitudes model similar processing that occurs in biological vision systems.

The perimeter edge strength module 12 measures the visual strength of a pattern's perimeter in the northern, southern, eastern, and western directions. Thus, the module's output indicates the orientational strength of a pattern's edges.

In measuring the edge strengths of a pattern, both the perimeter and pattern edge strength modules evaluate an edge's magnitude with no special regard for the edge location within an image. To illustrate this rationale, consider the image blocks A, B, C, and D of FIG. 2, which could be evaluated for their horizontal edge strengths. The images labeled A and B would produce the same edge strength, because lines A and B, although at different image locations, are of the same length. In contrast, image C would produce a higher strength value than image D because image C includes more and longer lines than image D.

To implement either of the edge strength preprocessors described above with a LTM NN, the NN would ideally model the orientation sensitive biological NN found in the human primary visual cortex. Thus, the implemented NN might measure, for example, the edge strength of a binary pattern in the horizontal direction. Design constraints implied by this biological-like function of the NN, as discussed below, dictate considerations of both the NN's architecture and interconnections.

The network architecture suggested by the biological design constraints, as shown in FIG. 3, consists of a layer of M input neurons 16 which receive the input pattern, a network of N neurons located within the network, called hidden neurons 18, and a single output neuron 20. This architectural framework allows direct correlation between the neurons of the artificial and biological networks. The network input layer is composed of, for example, a 7×7, 2-dimensional array of neurons, for a total of M=49 input neurons. Connected to the input layer, the hidden neuron network may include N=25 interconnected neurons, with some subset of those neurons being connected to the output neuron.

Figure 2A:
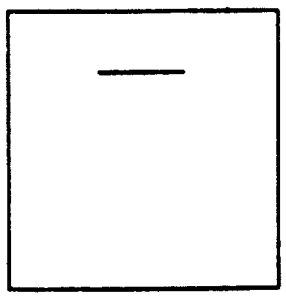
Figure 2B:
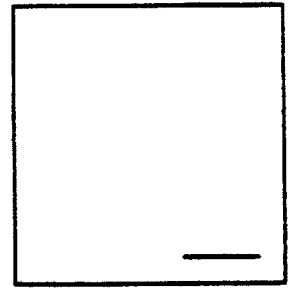
Figure 2C:
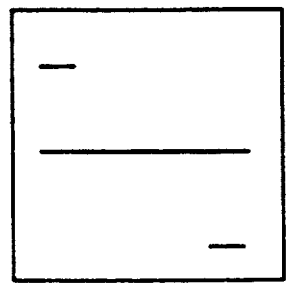
Figure 2D:
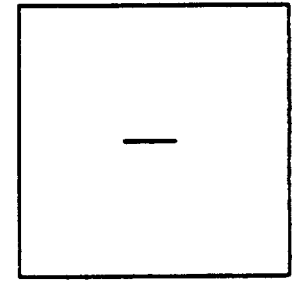
Figure 4:
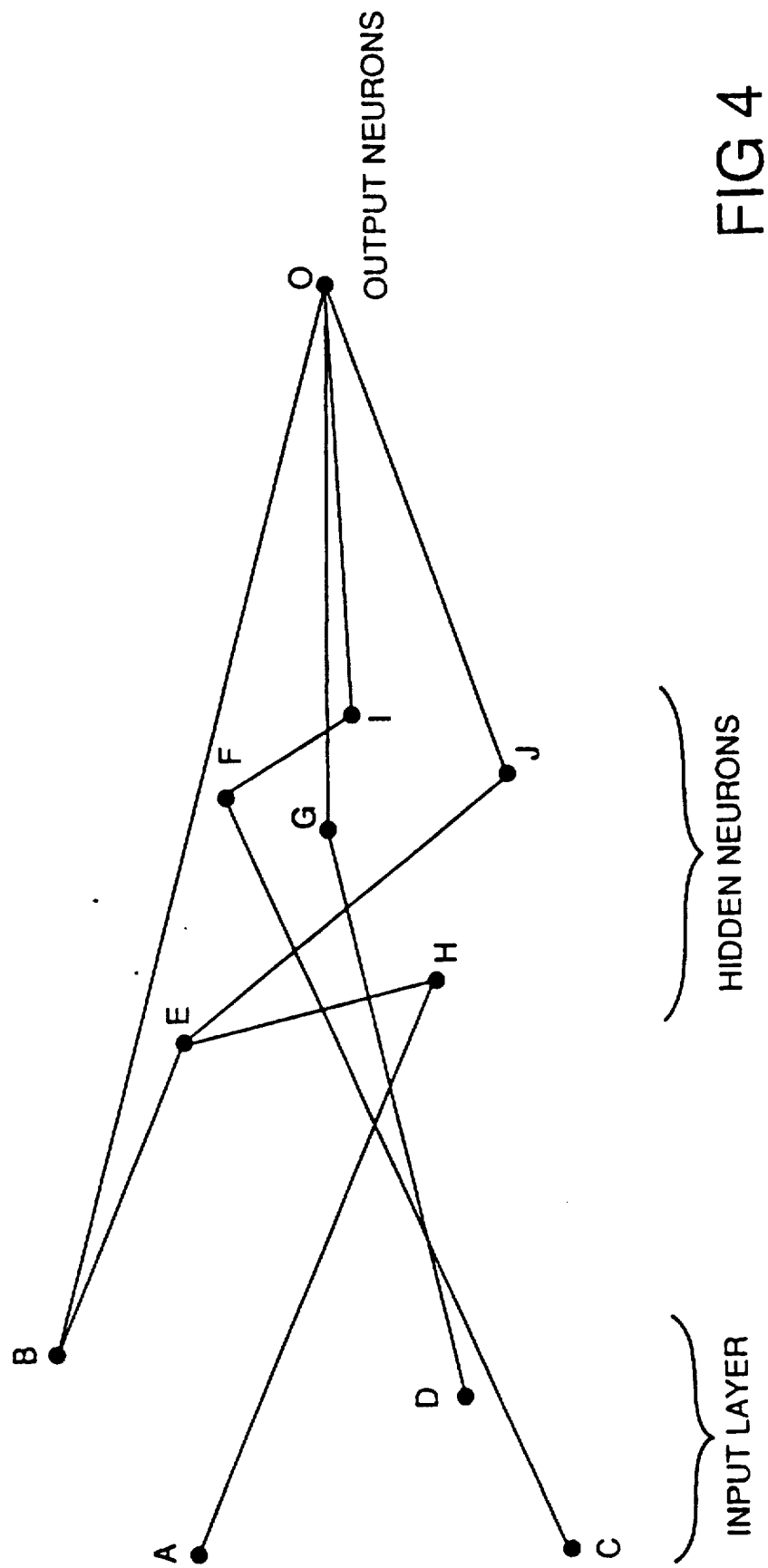
FIG. 4 is a diagram of neurons and interconnections within the network.

Considering the network architecture in more detail, FIG. 4 illustrates a subset of some possible network interconnections for the network. The input neurons, labeled A-D in the figure, are configured in an array so that each may accept one piece, or pixel, of an input pattern. This capability mimics the process by which a visual image would be defined on the input layer of the human primary visual cortex. The output connection of each input neuron is specified to connect it with some set of hidden neurons, labeled E-J in the figure, and possibly the output neuron, labeled O in the figure. Within the hidden neuron network, each neuron may be connected to some set of input neurons, some set of hidden neurons, and the output neuron, but all three types of connections are not required for any given neuron.

In operation, the activation state of each neuron determines whether or not it "fires", i.e., whether or not it sends an output signal to the other neurons connected to it. This activation is determined by all of the input signals received by each neuron, i.e., a neuron's activation depends on the activation of the neurons connected as inputs to it. Arrows in the figure indicate the direction of input and output for each connection between a pair of neurons. If a neuron's activation is smaller than a design threshold, the neuron will not send any output signals. If the neuron's activation reaches or passes the design threshold, it will "fire" by sending an output signal along each of its output connections.

When a neuron "fires", its output signals act to affect the activation states of the neurons to which it sends signals. There are two possible conditions, called types, of neuron output signals. A neuron's output signal may be excitatory (type 1), meaning that it is trying to "turn on" a succeeding neuron by raising that neuron's activation state. Alternatively, the neuron's output may be inhibitory (type 2), meaning that it is trying to "turn off" a succeeding neuron by lowering that neuron's activation state.

Each neuron is specified as being either excitatory or inhibitory by assigning a multiplication factor, called a weight, to each of its output connections. When a neuron "fires", sending multiple output signals, each of those signals is multiplied by the weight of the particular connection it has been sent through. A positively weighted signal acts to increase a succeeding neuron's activation, while a negatively weighted signal acts to decrease a succeeding neuron's activation. This custom weighting of each output signal is what enables a neuron to increase or decrease the activation of a succeeding neuron. The particular assigned weight determines the degree to which one neuron's output signal contributes to the next neuron's activation.

The connections of each neuron in the example NN are further defined such that when any of the hidden neurons or the output neuron "fires", it does not send an output signal back to the input layer. However, output signals of each hidden neuron may be sent to other hidden neurons as feedback within the hidden neuron network.

These activation and connection design rules are supplemented by design constraints, based on experimental physiology, which are applied to the network architecture to model the behavior of the biological NN of the visual cortex. The additional design constraints include:

(1) A neuron has no feedback connection to itself.

(2) Each of the neurons is excitatory or inhibitory, but not both simultaneously.

(3) All input neurons are excitatory, and all hidden neurons are inhibitory.

Constraint (3) defines the example NN to be of the ON-Center/OFF-Surround architecture. Operationally, this implies that the input neurons are always trying to turn on the hidden neurons they are connected to, as well as the output neuron, while the hidden neurons are all trying to turn off the other hidden neurons they are connected to, as well as the output neuron.

The output neuron does not send any signals backward to the hidden or input neurons; its only output signal is, in the example, the NN's horizontal edge strength measure for an input pattern. This output signal is a real analog number, with the range of the signal determined by the NN interconnection design and training, as discussed below.

Given all of the design rules and assumptions discussed above, the last remaining NN design specification is the choice of interconnections between all of the NN neurons. This interconnection choice may be considered as the selection of the NN interconnection weights, as an interconnection weight of zero implies that no interconnection exists, while a positive weight causes an interconnection to be excitatory and a negative weight causes an interconnection to be inhibitory.

Each interconnection weight, and the NN set of weights together, is chosen to enable the NN to provide a desired relationship between a set of input patterns and the output horizontal edge strength measures the NN would generate for the set. In particular, the NN weight set is chosen to define the range of the output signal and the correspondence between values in the range and strength of a given horizontal edge. Thus, the weight set selection acts to calibrate the NN for a design specified input-output (I/O) relationship.

In the invention, a trial and error approach is used to select the NN interconnection weights. The inventive method eliminates the need for certain simplifying assumptions required in known techniques for designing interconnection weights for a NN. Furthermore, the resulting NN may require fewer neurons and fewer interconnections than a corresponding NN designed using other methods. Also, the resulting NN may be easier to implement than a corresponding NN designed by known methods.

The particular trial and error strategy employed by the current invention is a form of the general search strategy called the genetic algorithm (GA). The GA is a known search procedure, inspired by evolution and heredity, for locating high performance structures in a complex task domain. It is an iterative technique for exploring large search spaces and complex problems of the kind that lack convenient closed forms. For NN design purposes, it is a search method for finding a good set of interconnection weights in a high-dimensional, non linear weight space.

Note that the weight space, or set of possible NN interconnection weights in our example, is large enough (there are 49 input neurons and 25 hidden neurons) to discourage simple trial and error search procedures. In a traditional unstructured search, the interconnection weights would be selected by random, the performance of the newly defined NN computed, the result evaluated, and the process repeated until a satisfactory result is obtained. This is equivalent to numeration because each weight selection trial is unaffected by the outcome of previous selection trials. For any but the simplest cases it is easy to show that this is not a practical technique because of the large number of trials required before a satisfactory set of weights is achieved.

In general, the GA principle gives guidelines for constructing practical search techniques when the number of possible trials is extremely large. The fundamental requirements for solving a trial and error problem with the GA are that the problem must be capable of being represented by some data structure and that the problem's solutions be capable of being evaluated.

The general GA procedure is defined as follows: A set of structures, called a generation, is created, which attempts to solve a particular problem. The structures, generally known as schemas, are manipulated by one or more genetic operators to create a new set of structures. These new structures are evaluated on how well they solve the problem and the best are saved, thereby creating a new generation. A requirement for constructing further generations is that the advances already made must be retained and that the retained advances be used to increase the population of fit structures. This evolutionary process is repeated until a structure produces an acceptable solution to the problem.

To choose the optimum set of NN interconnection weights, the GA procedure is implemented as follows:

(1) An initial set of interconnection weights is formed by randomly choosing a value for each of the weights in the whole NN.

(2) The weight set is manipulated by a genetic operator to create a new generation of weight sets.

(3) Each weight set which is a member of the new generation of weight sets is evaluated on how well its corresponding NN responds to a set of test, or training, input patterns in generating a horizontal edge strength measure for each of the training patterns.

(4) Steps (2) and (3) are repeated until a set of interconnection weights produces a NN with an acceptable relationship between input patterns and output horizontal edge strength measures.

In step (1) of the design procedure, the set of NN interconnections must be represented in a manner that can be easily mapped to a representation that can be subjected to a GA operator. This mapping is achieved by formulating a mathematical representation of the activations of each of the neurons in the NN to be designed. This formulation is called the short-term memory (STM) equation, and describes the activation of a neuron by all of the inputs to that neuron. The most general STM is shown as Eqn. 1 of FIG. 5.

$Z_{ji}$, defined in Eqn. 1 as the LTM trace from the j-th neuron to the i-th neuron, is the weight value assigned to the interconnection between the j-th neuron and the i-th neuron. Thus, the matrix of coefficients includes the complete set of $Z_{ji}$s for all i and j that we seek. The function $f(x_j)$, called a sigmoid function, is defined to set the threshold for activation of a neuron. Thus, for example, using a simple step function as the sigmoid function would cause a neuron with an activation below the step never to "fire", and would cause a neuron with an activation above the step to always to "fire".

Interpreted literally, the STM equation shows that any changes in the activation of a neuron are determined by the sum of any external inputs to that neuron ($I_j$), all of the weighted signals received from other neurons ($Z_{ji}$), and the current activation of the neuron. This equation is the cornerstone of NN design and is adequate for an initial NN design. If desired, it can be replaced with the shunting STM Equation for a better model.

Given the desired NN architecture described above and in FIG. 3, the STM equation can be customized to specifically describe the activations of neurons in the input layer, hidden layer, and output of the NN. Since neurons in the input layer have no interconnections between themselves, Eqn. 1 simplifies to Eqn. 2 of FIG. 5 for the input layer neurons, showing that input neurons only receive inputs from the pattern defined on them.

Neurons located within the hidden neuron network may receive inputs from any of the input neurons and any of the other hidden neurons, so that the STM equation for the hidden neurons simplifies to Eqn. 3 of FIG. 5.

Likewise, the output neuron may receive inputs from any of the input or hidden neurons, so its STM equation simplifies to Eqn. 4 of FIG. 5.

In Eqn. 3, the interconnection weights may be grouped between those associated with connections between the input layer and a hidden neuron and those associated with connections between two hidden neurons. This new hidden neuron STM equation, as shown in Eqn. 5 of FIG. 5, delineates the weight interconnections within the hidden network as $Z_{ji}$ and interconnections between the input layer and hidden network as $Z'_{ki}$.

In the steady-state, each of the input neuron activations will approach the external inputs applied to them, i.e., $x_k$ will approach $I_k$, where $k = 1, \ldots, M$. For this case, the steady state hidden system STM equation becomes Eqn. 6 of FIG. 5.

To map the interconnection weights to a structure which may be manipulated by a GA operator, matrix notation is introduced as shown in Eqn. 7 of FIG. 5. Each element of matrix X represents the activation of the corresponding neuron in the hidden neuron network. Using this matrix notation, the hidden neuron STM equation (Eqn. 5) becomes that of Eqn. 8 of FIG. 5.

Using this matrix notation, each element of matrix A represents the corresponding interconnection weight between two of the hidden neurons. As an example, FIG. 6(a) illustrates what the elements of matrix A would be for the simplified NN of FIG. 4. The first element of matrix A, $Z_{EE}$, is the weight coefficient of the interconnection from hidden neuron E back to itself. Although, as was discussed above, this interconnection is not actually allowable by the design rules, it, like every other theoretically possible interconnection from neuron E, is included in the general matrix.

Similarly, the second element of the first row, $Z_{EF}$, describes the weight of the connection from hidden neuron E to hidden neuron F. Thus, the first row of matrix A includes the interconnection weights for all possible connections from neuron E and all of the other hidden neurons. Likewise, all of the other rows and columns of matrix A represent each of the other possible connections between the hidden neurons.

As shown in FIG. 6(a), matrix B represents all of the possible interconnections between the input layer neurons and the hidden layer neurons. Thus, each element of matrices A and B may be directly correlated to a physical interconnection of the NN being designed.

Continuing with the matrix notation and considering the output neuron activation, the steady-state output is denoted simply as Z, i.e., $x_O$ approaches Z in the steady-state. Then the output neuron's STM equation may be grouped to delineate which interconnections are coming from the input layer and which are coming from the hidden layer, the sets of interconnections being represented in Eqns. 9 and 10 of FIG. 5.

FIG. 6(b) illustrates what matrices C and D would look like for the example NN of FIG. 4. Matrix C includes all of the possible connections between hidden neurons and the output neuron. Matrix D includes all of the possible connections between input layer neurons and the output neuron.

Given this matrix formulation of the NN activations, the design rules and constraints discussed above can be efficiently and understandably imposed as the GA is used to determine an optimum set of interconnection weights. Further, and more importantly, the A, B, C, and D matrices can be directly manipulated by the GA procedure to solve the weight search. Indeed, each GA interconnection generation is simply a new copy of the interconnection matrices, so that each matrix element coefficient (weight) plays a role analogous to a DNA molecule in biological evolution.

To begin the GA interconnection weight search procedure using the weight matrix notation, the activation, connection, and physiological design rules discussed above must be imposed on the interconnection weights, and thus on the interconnection weight matrix elements. With these constraints, the weight matrices for the ON-Center/Off Surround NN being designed have the following properties:

(1) A has zero diagonal components,
(2) A and C have only negative or zero elements,
(3) B and D have only positive or zero elements,
(4) The rows of A give the lateral inhibition to other hidden neurons.

While these constraints are difficult to include in standard design techniques, it will be seen that they can be easily accommodated using the GA search technique. FIG. 7 summarizes the constraints on the system matrices for the biological-like NN.

Figure 8:
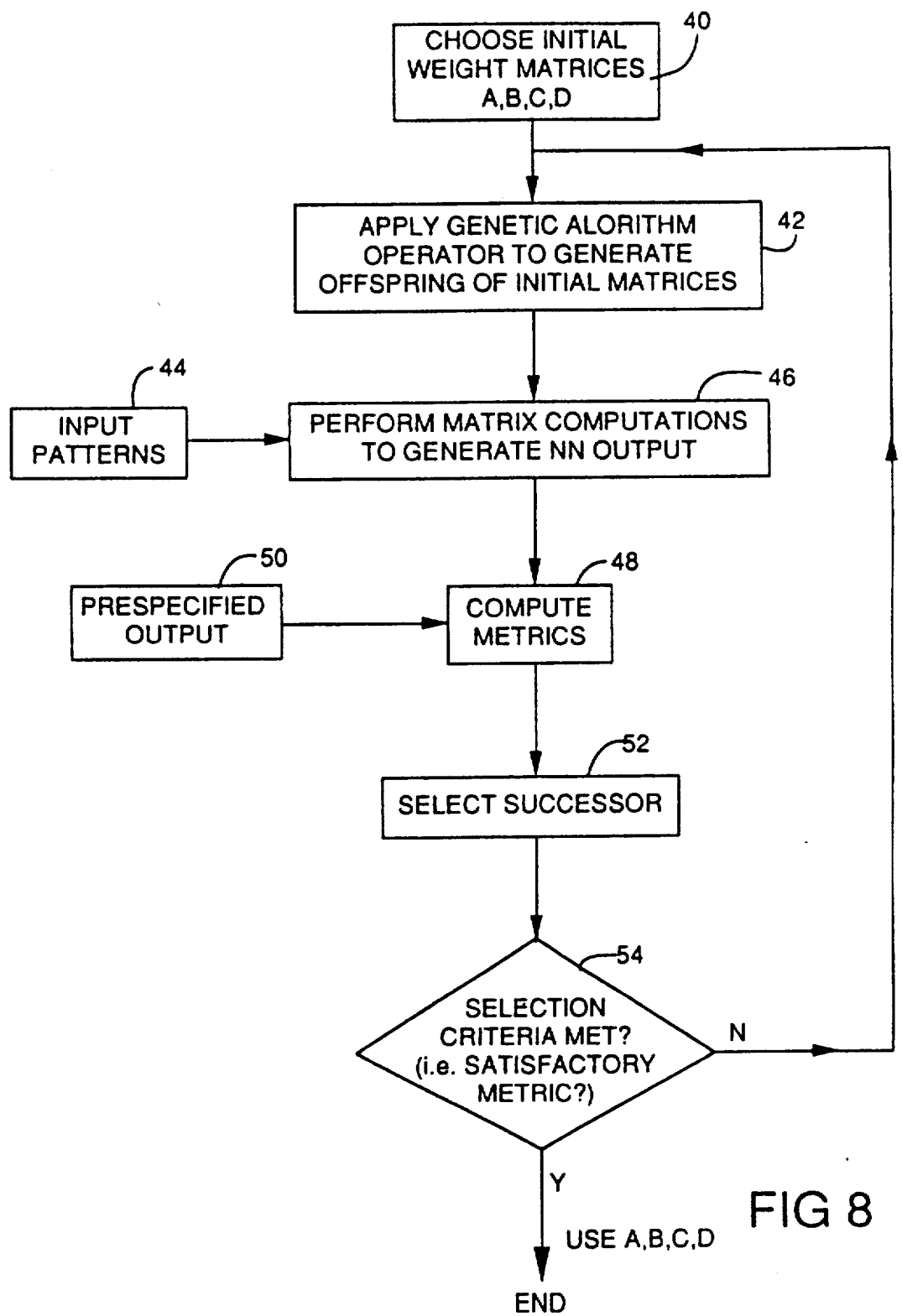
FIG. 8 is a flow chart of a method of designing the interconnection weights.

With these constraints in place, the computational steps for the NN design procedure (see FIG. 8) are as follows:

(1) Form (40) a parent initial matrix set A, B, C, and D of interconnection weights which satisfy the design constraints.

(2) Make copies of the parent set of matrices, and for each copy (42), randomly select a number of the matrix elements to be changed, subject to maintaining the above matrix properties, to produce successor matrices (offspring). In GA terminology, a mutation operator is used to construct new generations.

(3) Apply a set of input patterns (44) to each NN corresponding to one of the copies and solve (46) for each NN's edge strength output for each pattern. (Note that a solution may not always exist.)

(4) Compute (48) a metric to quantify the discrepancy between each of the NN outputs of (3) and the prespecified solution (50).

(5) Select (52) the copy of the A, B, C, and D matrix set which provides the best NN I/O relationship (i.e., has the smallest discrepancy metric). Make this copy the survivor.

(6) Use the survivor as the parent for the next generation and repeat steps (2)-to-(5).

(7) Continue until the selection criterion is met (54).

(8) The surviving matrix set A, B, C, D determines the interconnection weights for the final NN design.

The example NN edge strength preprocessing modules to be designed using the above procedure contain, as described previously, 49 input neurons, 25 hidden neurons, and one output neuron. This NN requires 1924 interconnection coefficients to be specified. For simplicity, the sigmoid function defined in the activation equation is a unit step. The model is a "sum of sigmoids" not the usual simplifying approximation of "sigmoid-of-sums".

To implement step (1) of the design method, a random number generator is used to specify the matrix elements, thus establishing an initial parent set of interconnection weight matrices. Although the elements of the parent matrix set are chosen randomly, the interconnection constraints described above are followed in the choice. The random selection of initial matrix elements increases the likelihood that some portion of initial weights will be adequate immediately, thus decreasing the required computation of new generations.

Using the GA mutation operator, each new generation is created by first making 10 copies of the parent matrix set A, B, C, D. Then, for each copy, one-third of the weight elements of each matrix are randomly changed, subject to the given interconnection constraints, over the search range 0, $+/-1$, $+/-2$, ..., $+/-10$. While other GA operators may be feasibly used with the current inventive NN design method, the mutation operator is most easily applied to the schema defined by the matrix notation and has been found to be sufficient.

The choice of 10 copies (or offspring) per generation and one third changes per copy is purely logistical and may be chosen differently without affecting the efficiency of the method. Similarly, the search range limit of $-10$ to $+10$ places a boundary on the search space to speed up the calculations, and may be chosen differently.

To implement step (3) of the design procedure, the 12 training patterns illustrated in FIG. 9 are input to each of the NN offspring of the current generation, and each of the NN offspring's responses is calculated. The arrangement of 1's on a background of 0's in each training pattern represents a possible edge. A desired output is specified for each input training pattern, and a metric is defined to measure the distance, or error, of the NN response from the desired output. Many metrics are possible. One possible metric specifies that for each input pattern, the NN output response Z should lie within a bank of upper and lower bounds. This HI-LO metric, described below, is used to calibrate the desired NN output measurement for each training program. The metric defines the acceptable NN output to be in the range 50-100 for the "high response" training patterns, and $-100$-10 for the "low response" training patterns.

As shown in FIG. 9, training patterns 1, 2, and 3 are examples of input patterns with horizontal lines, and so should elicit a high response from the NN, with pattern 1 generating the highest response. Training patterns 4-12 of FIG. 9 have little or no horizontal components in them, and so should elicit varying degrees of low responses.

Figure 10:
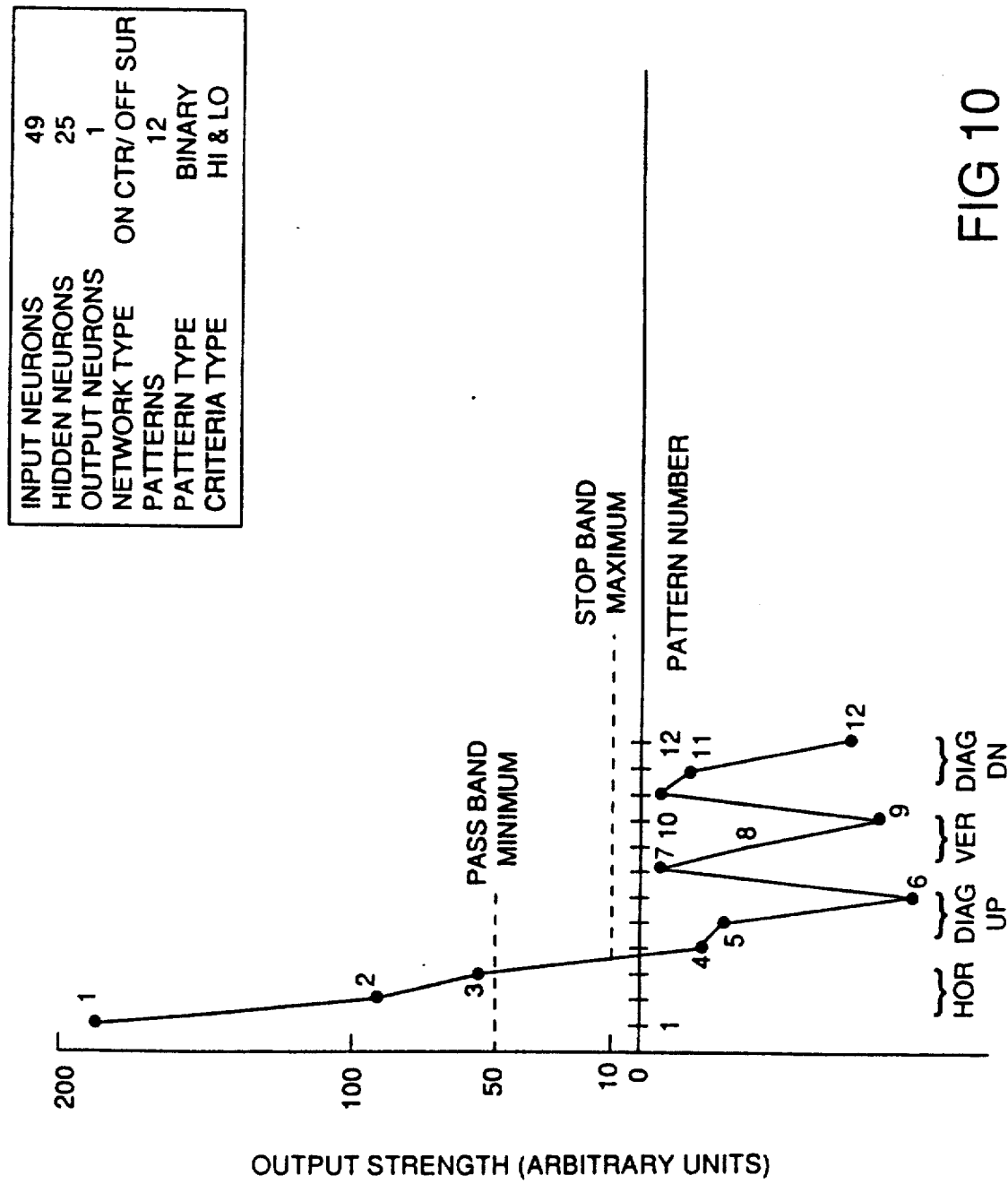
FIG. 10 is a diagram of horizontal feature detector response.

FIG. 10 illustrates the mapping of acceptable output responses, or Zs, for each of the 12 training patterns, to the response ranges. The first dot, labeled 1 in FIG. 10, is the output Z for the first training pattern. For this case, Z surpasses the HI band limit of 100 because of its maximum horizontal strength. The dots 2 and 3 lie above the HI pass band minimum of 50 because they have a high degree of "horizontalness". The dots corresponding to patterns 4-12 are expectedly located between $-100$ and 10, indicating their degree of horizontal edge strength.

The HI-LO metric is formulated by summing the error of the NN output for each training program. Thus, for $N_p$ training patterns, the error, d, of the NN output is given by Eqn. 11 of FIG. 5. As shown by Eqn. 12 of FIG. 5, if the NN correctly calls a "high pattern" "high" or a "low pattern" "low", $d=0$ for that pattern. If the NN incorrectly measures a pattern's horizontal edge strength, $d=1$ for that pattern.

Another type of metric would require that the output be above a passband threshold for certain patterns and be below a stopband threshold for the other patterns. This PASS-STOP criterion is formulated as follows:

For $N_1$ PASS patterns and $N_2$ STOP patterns, with $N_p = N_1 + N_2$, the error, d, of the NN output is given by Eqn. 13 of FIG. 5. As shown in Eqn. 14 of FIG. 5, if the NN correctly identifies a pattern, $d=0$ for that pattern, while $d=1$ if the pattern is not identified correctly.

For both metrics, the inequality of Eqn. 15 of FIG. 5 holds true. The condition $d=N_p$ means that the NN satisfies none of the selection criteria (maximum error); the condition $d=0$ means that the NN satisfies all the selection criteria and that a solution has been reached. In the design procedure the metric, d, starts at $N_p$ (or smaller) and monotonically decreases to zero.

To compute the error d for each NN copy and pattern, Eqn. 8 of FIG. 5 must be solved for the steady state activation matrix X with that copy and pattern. Once X is known, the NN output Z is computed directly with Eqn. 10 of FIG. 5. This Z is then compared to the HI-LO metric to determine the error d. Recasting Eqn. 8 of FIG. 5 to reflect a particular NN, given the matrices $A_{NXN}$ and $B_{NXM}$ and an input pattern $I_{MX1}$, it is required to solve Eqn. 16 of FIG. 5.

Assume for illustration that $I_{MX1}$ is binary. It is easily shown that for some choices of {A,B,I} no solutions may exist, a single solution may exist, or multiple solutions may exist.

The solution of non linear matrix equations such as Eqn. 16 of FIG. 5 may be achieved using many different methods. The method used for the inventive design procedure is a combination of operator decomposition followed by recursion based on a fixed point theorem. The first two terms of the operator decomposition solution, $X_0$ and $X_1$, are given by Eqns. 17 and 18 of FIG. 5. The recursive form used to solve for a final X matrix is given as Eqn. 19 of FIG. 5, with $X_1$ being the initial value. The recursion is continued until $X(+) = X(-)$.

The above recursion scheme will converge to a solution if and only if the operator defined by the right-hand side of Eqn. 19 of FIG. 5 is a contraction operator. In practice, an operator may be a contraction in some subspaces and not in other subspaces. For the horizontal edge strength NN, the initial values generated by operator decomposition will be in a contraction subspace for more than 90% of the choices of the A and B matrices. It typically requires 7 to 10 recursions to reach the final solution of the activation equation.

To complete steps (4), (5), and (6) of the design procedure, the metric d of each of the 10 different offspring NNs is compared with the metric d of the parent NN. If an offspring metric is below the parent metric, then the offspring replaces the parent NN for the next generation. When two or more offspring NNs all are more satisfactory than a parent NN, one of the offspring is randomly chosen to become the new parent.

To summarize the system variables chosen for the inventive design method, Table 1 lists together all of the design rules chosen to complete the 5-step procedure outlined above.

TABLE 1

INPUT PARAMETERS FOR DESIGNING A HORIZONTAL FEATURE DETECTOR USING AN ON-CENTER OFF-SURROUND NEUTRAL NETWORK

| | |
|---|---|
| INPUT NEURONS (M) | 7 × 7 (49) |
| HIDDEN NEURONS (N) | 25 |
| COPIES PER GENERATION | 10 |
| FRACTION OF WEIGHTS VARIED PER COPY | ⅛ |
| SEARCH RANGE | 0, +/−1, +/12, ..., +/−10 |
| HIGH BAND | 50 TO 100 |
| LOW BAND | −100 to 10 |

Figure 11:
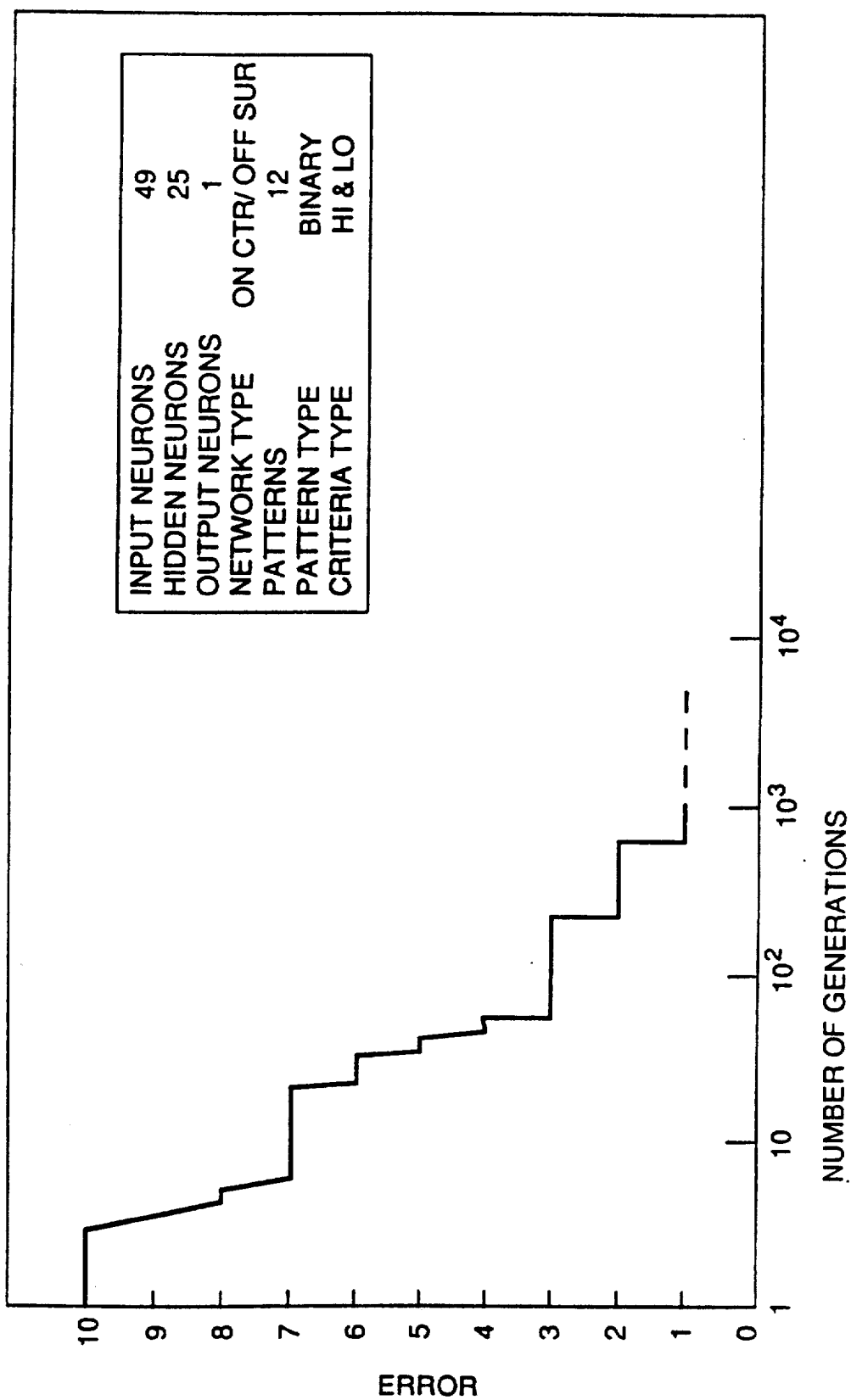
FIG. 11 is a diagram of the generational history of metrics during the design process.
Figure 12A:
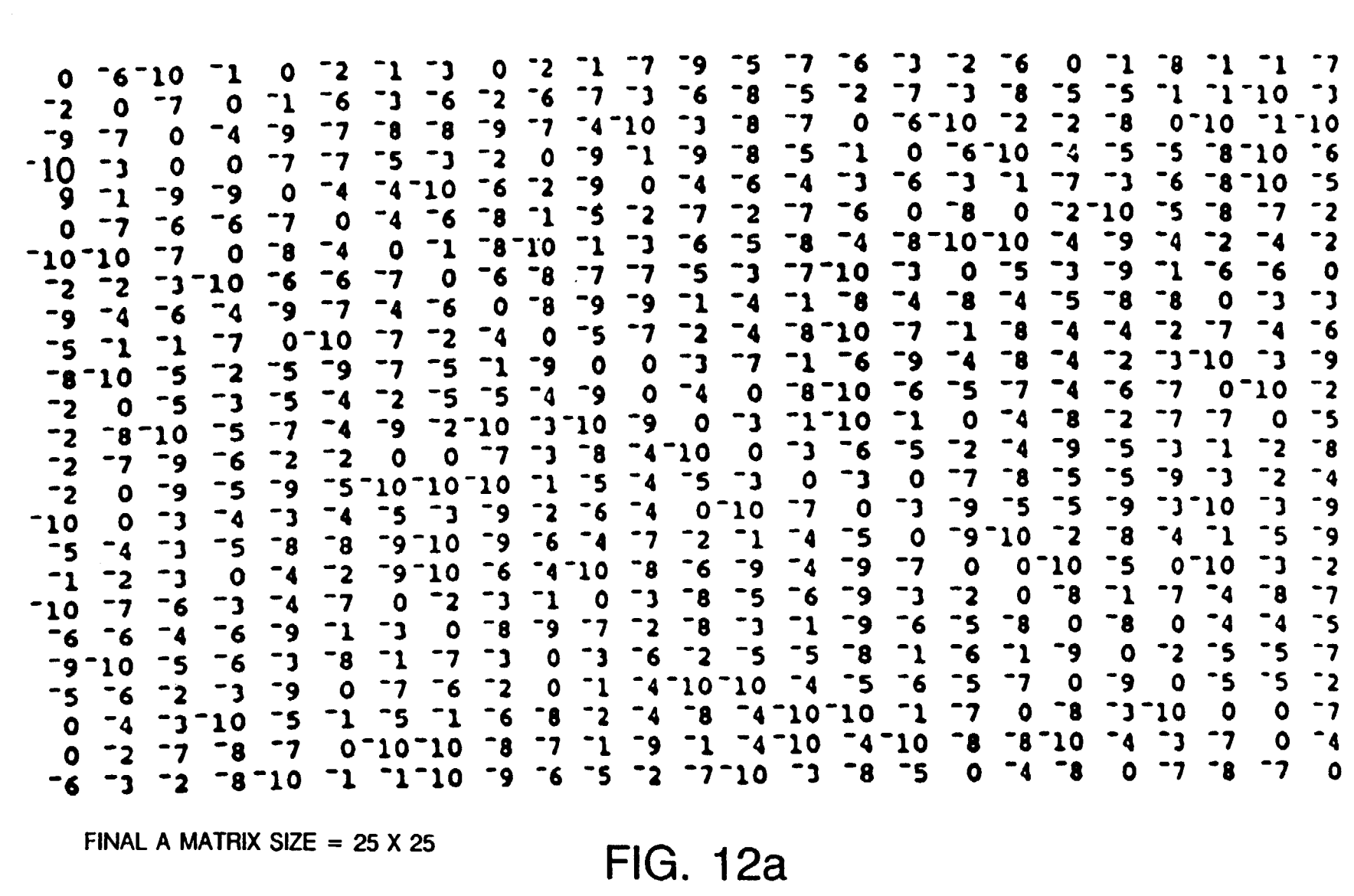
Figure 12B:
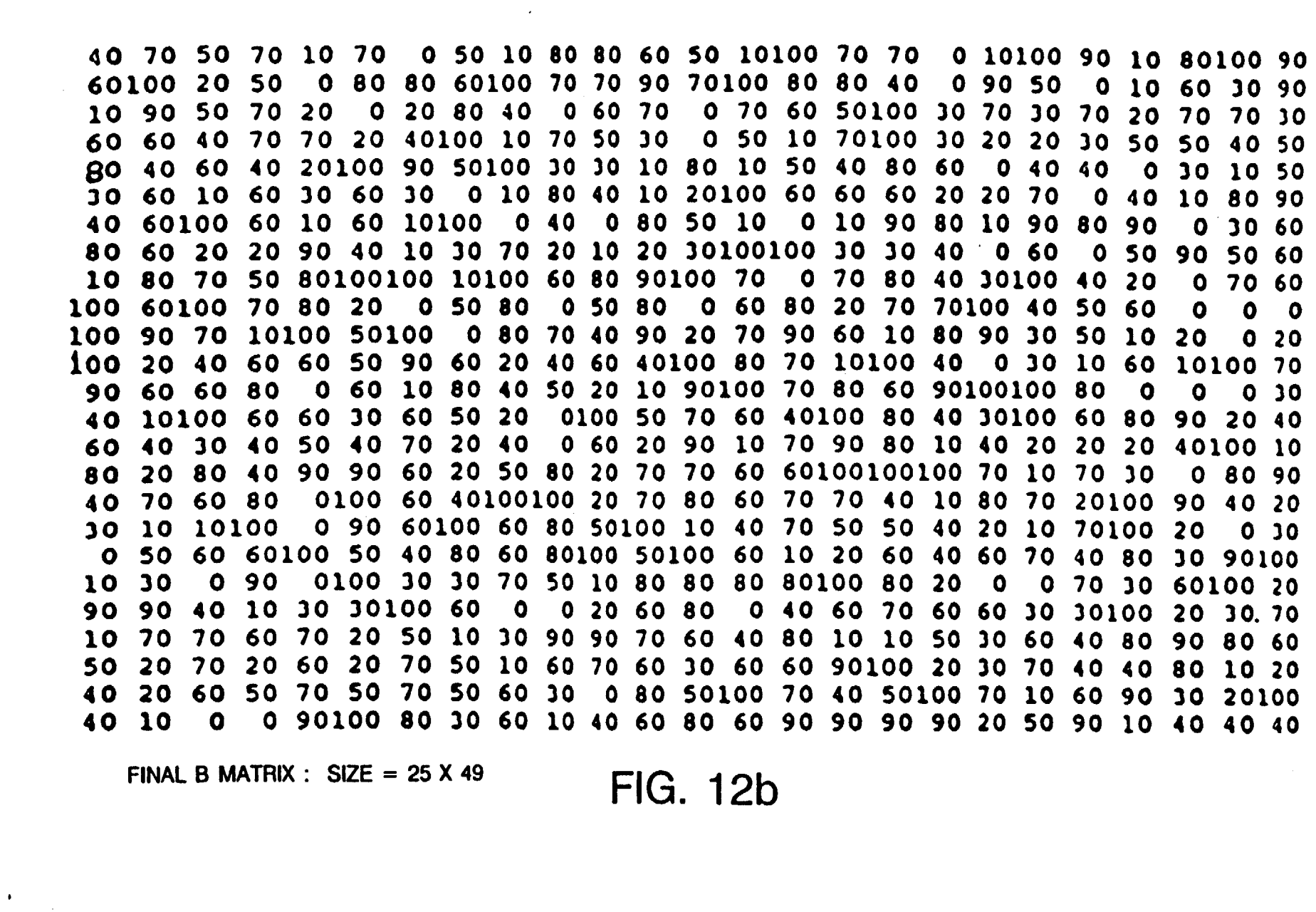
Figure 12C:
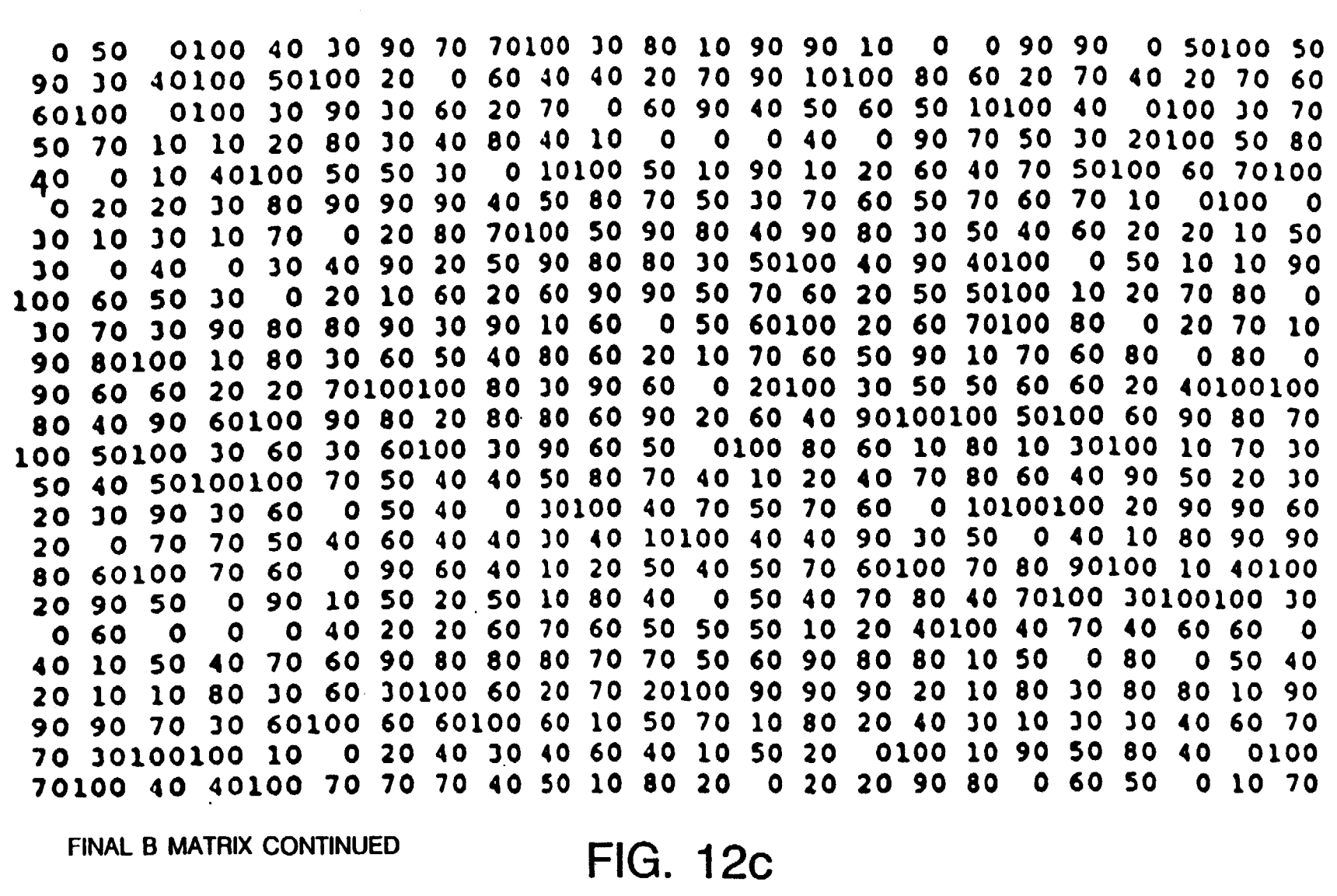

FIG. 11 illustrates the time history of the metric d as the GA design procedure evolves a set of interconnection weight matrices to an acceptable solution. The acceptable solution is achieved after about 600 NN generations. The one remaining error at the 600th generation corresponds to the response above the high threshold from the first training pattern, which is acceptable. FIGS. 12A through 12D illustrate the final A, B, C, and D matrices that the example GA design procedure produces. These matrix values are used to implement the NN interconnections so that the resulting NN measures edge strength values within the output range defined by the training patterns.

In practice, one would like to minimize the computation time required to reach an acceptable generation of NN interconnection weights. Two of the critical parameters to be chosen for this consideration are the number of hidden neurons in the NN and the number of copies made per generation of the GA procedure. The relationship between these parameters follows a power law, as shown by Eqn. 20 of FIG. 5.

To illustrate this relationship, the effect of changing these parameters is shown for a fixed cooperative-competitive (C—C) NN. In a C—C NN, the hidden neurons maybe of both types 1 and 2 (excitatory and inhibitory, respectively). Therefore, in applying the matrix constraints to a C—C NN, the system matrix properties for ON-Center/OFF-Surround NNs are modified as follows: property (1) still holds while properties (2) and (3) are changed such that the corresponding columns of matrices A&C and C&D have the same sign.

FIGS. 13 and 14 illustrate the number of generations required to find an acceptable interconnection weight set as a function of the number of hidden neurons and the copies made per generation, respectively. As shown for this C—C case, $\alpha = 1$ and $\beta = -3/2$. Since the total computer design time is proportional to the total number of copies, i.e., to NG × NC, to first order the computational time varies as $N/NC^{\frac{1}{2}}$. Because the mutation process is random, the number of generations required for solution is also random. The brackets indicate the range over which solutions were determined.

The design method of the invention may be generally applied to any NN design which can be mathmatically formulated to allow for manipulation by a GA operator. For example, a diagonal, rather than horizontal, feature detector may be designed. FIG. 15 illustrates the NN output response Z of a diagonal edge strength NN measurer using the same training set described above. This NN is designed using the same method described above, but with different HI-LO bands so that a 45 degree diagonal detector NN is achieved. FIGS. 16a through 16D show the final matrices for the diagonal detector.

As a second example, the method may also be employed to design a NN analyzing gray input images, rather than binary images. A summary of this design method is as follows: The gray input pixel values are scaled to lie in the interval [0,1] using a digitizing preprocessor. To preserve the grayness of the input image, a piecewise linear sigmoid function with saturation is used in the activation equations so that a neuron's "firing" threshold is analog like, rather than digital. With this definition, the X matrix (hidden neuron activations), and NN output response Z are given by Eqns. 21 and 22 of FIG. 5. Here $f_1( )$ may be a unit step as before and $f_2( )$ is a piecewise-linear sigmoid with saturation such as given by Eqn. 23 of FIG. 5. This set of equations is used in the above design procedure to achieve a NN which is sensitive to edge gradient measurements of gray, rather than binary, images.

The method may also be used to design a NN with multiple outputs, rather than a single output neuron, or with other I/O properties. The method may be extended to generally provide a design framework for constructing any type of NN to have a desired network performance.

The method may be implemented by software. An example of code that implements the method is set forth in Appendix A. The code in Appendix A is written in the APL language, and may be run and compiled on the IBM-AT computer. Appendix A is subject to copyright protection. The copyright owner has no objection to the reproduction of Appendix A as it appears in the United States Patent and Trademark office, but otherwise reserves all copyright right whatsoever.

Other embodiments are within the claims.

GREY

```
      ∇DESIGND[□]∇
[0]   DESIGND
[1]   AXXXXXXXXXXXXXXXXXXXXXXXXXXXXXXXXXXXXXXXXXXXXXXXXXXXX
[2]   APRGM DESIGNS ON-CENTER/OFF-SURROUND, MULTI-INPUT, SINGLE OUTPUT NN'S.
[3]   AXXXXXXXXXXXXXXXXXXXXXXXXXXXXXXXXXXXXXXXXXXXXXXXXXXXX
[4]   AM= INPUT DIMENSION
[5]   AN= NUMBER OF HIDDEN NEURONS
[6]   A
[7]   ANPATTERN= NUMBER OF TRAINING PATTERNS
[8]   APATTERN[K;;]= INDEXED SET OF TRAINING PATTERNS
[9]   AT= TARGET SEQUENCE
[10]  ATHI= TARGET SEQUENCE UPPER BOUND
[11]  ATLO= TARGET SEQUENCE LOWER BOUND
[12]  AD= METRIC
[13]  A
[14]  AL= RANGE OF INITIAL VALUES FOR A,B,C MATRIX ELEMENTS
[15]  ARANGE= -L,....,0,1,...,L
[16]  AP= 1/PROBABILITY OF AN ELEMENT CHANGE
[17]  ANC= NUMBER OF COPIES PER GENERATION
[18]  ANG= NUMBER OF GENERATIONS
[19]  A
[20]  AINITIALIZE
[21]  A
[22]    TSTART←□TS
[23]    INITIALD
[24]  A
[25]    FRACTION←TRYCOUNT←SOLVECOUNT←ABORTCOUNT←0
[26]  A K←1  ← PRGM RUNS INDEFINITELY
[27]  AXXXXXXXXXXXXXXXXXXXXXXXXXXXXXXXXXXXXXXXXX
[28]  A-----------GENERATION LOOP--------------
[29]  AXXXXXXXXXXXXXXXXXXXXXXXXXXXXXXXXXXXXXXXXX
[30]  GLOOP:
[31]  A
[32]    KK←1
[33]  AXXXXXXXXXXXXXXXXXXXXXXXXXXXXXXXXXXXXXXXXX
[34]  A--------------COPY LOOP----------------
[35]  AXXXXXXXXXXXXXXXXXXXXXXXXXXXXXXXXXXXXXXXXX
[36]  CLOOP:
[37]    MAKECOPIESD
[38]  A
[39]    KKK←1
[40]  AXXXXXXXXXXXXXXXXXXXXXXXXXXXXXXXXXXXXXXXXX
[41]  A------------TRAINING LOOP--------------
[42]  AXXXXXXXXXXXXXXXXXXXXXXXXXXXXXXXXXXXXXXXXX
[43]  TLOOP: ATRAINING LOOP
[44]    TRYCOUNT←TRYCOUNT+1
[45]    SOLVEQU
[46]  AXXXXXXXXXXXXXXXXXXXXXXXXXXXXXXXXXXXXXXXXX
[47]  A-----------TEST FOR SOLUTION-----------
[48]  AXXXXXXXXXXXXXXXXXXXXXXXXXXXXXXXXXXXXXXXXX
[49]    →(TK≤10)/CONTINUE
[50]    □←' '
[51]    □←'SYSTEM NOT SOLVED'
[52]    □←'GENERATION= ',⍕K
[53]    □←'COPY=',⍕KK
[54]    □←'PATTERN=',⍕KKK
[55]    □←'ABORTCOUNT=',⍕ABORTCOUNT
[56]    FRACTION←SOLVECOUNT÷TRYCOUNT
[57]    □←'FRACTION OF COPIES SOLVED= ',⍕FRACTION
[58]    ABORTCOUNT←ABORTCOUNT+1
[59]    →(ABORTCOUNT>1000)/END
[60]    →CLOOP
[61]  CONTINUE:
[62]    SOLVECOUNT←SOLVECOUNT+1
[63]    OUTPUT
[64]    KKK←KKK+1
```

```
[65]  AXXXXXXXXXXXXXXXXXXXXXXXXXXXXXXXXXXXXXXX
[66]  A-------------END TRAINING----------------
[67]  AXXXXXXXXXXXXXXXXXXXXXXXXXXXXXXXXXXXXXXX
[68]      →(KKK≤NPATTERN)/TLOOP
[69]  AXXXXXXXXXXXXXXXXXXXXXXXXXXXXXXXXXXXXXXX
[70]  A-----------SELECT SURVIVOR---------------
[71]  AXXXXXXXXXXXXXXXXXXXXXXXXXXXXXXXXXXXXXXX
[72]      SELECT          ← ENTER # OF COMPLEMENTS TO PASS BAND
[73]      →(MINMETRIC=0)/END
[74]      KK←KK+1
[75]      →(KK≤NC)/CLOOP
[76]  AXXXXXXXXXXXXXXXXXXXXXXXXXXXXXXXXXXXXXXX
[77]  A-------------END COPIES------------------
[78]  AXXXXXXXXXXXXXXXXXXXXXXXXXXXXXXXXXXXXXXX
[79]      SYSTEM[⍳N;⍳N]←A←AMIN
[80]      SYSTEM[⍳N;(N+⍳M)]←B←BMIN
[81]      SYSTEM[(N+1);⍳N]←C←CMIN
[82]      SYSTEM[(N+1);(N+⍳M)]←D←DMIN
[83]      SYSMETRIC←MINMETRIC
[84]      ⎕←' '
[85]      ⎕←'GENERATION COMPLETED. NUMBER= ',⍕K
[86]      ⎕←'METRIC= ',⍕SYSMETRIC
[87]      ⎕←' '
[  ]  A GENERATIONVECTOR[K]←K
[  ]  A METRICVECTOR[K]←SYSMETRIC
[90]  AXXXXXXXXXXXXXXXXXXXXXXXXXXXXXXXXXXXXXXX
[91]  A------------END GENERATIONS--------------
[92]  AXXXXXXXXXXXXXXXXXXXXXXXXXXXXXXXXXXXXXXX
[93]      K←K+1
[94]      →GLOOP
[95]  A→(K≤NG)/GLOOP
[96]  AXXXXXXXXXXXXXXXXXXXXXXXXXXXXXXXXXXXXXXX
[97]  A-----------FINAL OUTPUT------------------
[98]  AXXXXXXXXXXXXXXXXXXXXXXXXXXXXXXXXXXXXXXX
[99]  END:
[100]     SYSTEM[⍳N;⍳N]←A←AMIN
[101]     SYSTEM[⍳N;(N+⍳M)]←B←BMIN
[102]     SYSTEM[(N+1);⍳N]←C←CMIN
[103]     SYSTEM[(N+1);(N+⍳M)]←D←DMIN
[104]     SYSMETRIC←MINMETRIC
[105]     ⎕←' '
[106]     ⎕←'FINAL SYSTEM: GENERATION = ',⍕K
[107]     ⎕←'METRIC = ',⍕SYSMETRIC
[108] A GENERATIONVECTOR[K]←K
[109] A METRICVECTOR[K]←SYSMETRIC
[110]     TSTOP←⎕TS

∇INITIALD[⎕]∇
[0]   INITIALD
[1]   AXXXXXXXXXXXXXXXXXXXXXXXXXXXXXXXXXXXXXXX
[2]   AGREY DESIGN INPUTS
[ ]   AXXXXXXXXXXXXXXXXXXXXXXXXXXXXXXXXXXXXXXX
[4]   A
[5]       M←49
[6]       N←36
[7]   A
[8]       NPATTERN←24
[9]       PATTERN←⎕FREAD 1 25
[10]  A
[11]      PASS← 7 8 9 10 11 12
[12]      STOP← 1 2 3 4 5 6 13 14 15 16 17 18 19 20 21 22 23 24
[13]      THI←25
[14]      TLO←5
[15]      MINMETRIC←NPATTERN .
[16]      S←(NPATTERN)⍴0
[17]  A
[18]      L←10
[19]      P←3
[20]      NC←10
[21]      NG←1000    ← NOT REQ'D
```

```
[22]  SCALE←((N+1),(M+N))ρ(Nρ1),(Mρ3) ⍝SCALES ELEMENT VALUES IF REQ'D.
[23]  METRICVECTOR←GENERATIONVECTOR←(NG+1)ρ0   METRICVECTOR← 0 ⍝
[24]  ⍝
[25]  SYSTEM←¯1+?((N+1),(N+M))ρ(L+1) ⍝CHOOSE RANDOM POS ELEMENTS
[26]  AMIN←A←-(SYSTEM[⍳N;⍳N]×~(N,N)ρ1,Nρ0) ⍝ ZERO DIAGONAL.
[27]  BMIN←B←(3×SYSTEM[⍳N;(N+⍳M)]) ⍝POS SUBMATRIX.
[⎕⎕]  CMIN←C←-((1,N)ρSYSTEM[(N+1);⍳N]) ⍝NEG SUBMATRIX.
[⎕⎕]  DMIN←D←(3×(1,M)ρSYSTEM[(N+1);(N+⍳M)])) ⍝POS SUBMATRIX.
[30]  SYSTEM[⍳N;⍳N]←A ⍝REVISE SYSTEM.
[31]  SYSTEM[⍳N;(N+⍳M)]←B
[32]  SYSTEM[(N+1);⍳N]←C ⍝REVISE SYSTEM.
[33]  SYSTEM[(N+1);(N+⍳M)]←D
[34]  ⍝XXXXXXXXXXXXXXXXXXXXXXXXXXXX

∇SELECT[⎕]∇
[0]   SELECT
[1]   ⍝METRIC
[2]   ⍝ METRIC←+/~(S=T)
[3]   ⍝METRIC←+/~((TLO≤S)∧(S≤THI))
[4]   METRIC←(+/~THI≤S[PASS])+(+/~TLO≥S[STOP])
[5]   →(METRIC≥MINMETRIC)/DONE
[6]   ⍝ →(S[2]<THI)/DONE
[7]   AMIN←ACOPY
[8]   BMIN←BCOPY
[9]   CMIN←CCOPY
[10]  DMIN←DCOPY
[11]  MINMETRIC←METRIC
[12]  METRICVECTOR←METRICVECTOR,K,METRIC
[13]  DONE:

∇INITIALD[⎕]∇
[0]   INITIALD
[1]   ⍝M←9
[2]   ⍝N←1
[ ]   ⍝
[4]   ⍝NPATTERN←4
[5]   ⍝PATTERN←(NPATTERN,3,3)ρ1
[6]   ⍝ PATTERN[1;;]←HOR
[7]   ⍝ PATTERN[2;;]←DIAGUP
[8]   ⍝ PATTERN[3;;]←VER
[9]   ⍝ PATTERN[4;;]←DIAGDN
[10]  ⍝ T←5,1,0,1
[11]  ⍝ THI← 6 2 1 2
[12]  ⍝ TLO← 4 0 ¯1 0
[13]  ⍝METRIC←S←(NPATTERN)ρ0
[14]  ⍝SYSMETRIC←MINMETRIC←5
[15]  ⍝ NPATTERN←4
[16]  ⍝ PATTERN←(NPATTERN,7,7)ρ1
[17]  ⍝ PATTERN[1;;]←HOR1
[18]  ⍝ PATTERN[2;;]←HOR2
[19]  ⍝ PATTERN[3;;]←HOR3
[20]  ⍝ PATTERN[4;;]←DIAGUP1
[21]  ⍝ PATTERN[5;;]←DIAGUP2
[22]  ⍝ PATTERN[6;;]←DIAGUP3
[23]  ⍝ PATTERN[7;;]←VER1
[24]  ⍝ PATTERN[8;;]←VER2
[25]  ⍝ PATTERN[9;;]←VER3
[26]  ⍝ PATTERN[10;;]←DIAGDN1
[27]  ⍝ PATTERN[11;;]←DIAGDN2
[⎕⎕]  ⍝ PATTERN[12;;]←DIAGDN3
[⎕⎕]  ⍝ PASS← 4 5 6
[30]  ⍝ STOP← 1 2 3 7 8 9 10 11 12
[31]  ⍝ THI←50
[32]  ⍝ TLO←10
[33]  ⍝ THI← 10 10 10 100 100 100 10 10 10 10 10 10
[34]  ⍝ TLO← ¯100 ¯100 ¯100 50 50 50 ¯100 ¯100 ¯100 ¯100 ¯100 ¯100
[35]  ⍝ T← 1 1 1 10 10 10 1 1 1 0 0 0
[36]  ⍝ THI← 4 4 4 20 20 20 4 4 4 4 4 4
[37]  ⍝ TLO← ¯10 ¯10 ¯10 7 7 7 ¯10 ¯10 ¯10 ¯10 ¯10 ¯10
```

```
[38] A T← 10 1 0 1
[39] A THI←T+3
[40] A TLO←T-3
[41] A M←2
[42] A N←3
[43] A NPATTERN←4
[44] A PATTERN←(NPATTERN,1,2)ρ1
[45] A PATTERN[1;;]← 1 2 ρ 0 0
[46] A PATTERN[2;;]← 1 2 ρ 0 1
[47] A PATTERN[3;;]← 1 2 ρ 1 0
[48] A PATTERN[4;;]← 1 2 ρ 1 1
[49] A T← 0 6 6 0
[50] A THI←T+2
[51] A TLO←T-2
[52] A M←21
[53] A N←25
[54] A NPATTERN←24
[55] A PATTERN←(NPATTERN,7,3)ρ0
[56] A PATTERN←TCELL1
[57] A PASS←ι12
[58] A STOP←12+ι12
[59] A THI←50
[60] A TLO←10
[61] AXXXXXXXXXXXXXXXXXXXXXXXXXXXXXXXXXX
[62] AGREY DESIGN INPUTS
[63] AXXXXXXXXXXXXXXXXXXXXXXXXXXXXXXXXXX
[64] A
[65]    M←49
[66]    N←25
[67] A
[68]    NPATTERN←18
[69]    PATTERN←⎕FREAD 1 25
[70] A
[71]    PASS← 1 2 3 4 5 6
[72]    STOP← 7 8 9 10 11 12 13 14 15 16 17 18
[73]    THI←50
[74]    TLO←10
[75]    MINMETRIC←NPATTERN
[76]    S←(NPATTERN)ρ0
[77] A
[78]    L←100
[79]    P←3
[80]    NC←10
[81]    NG←5
[82]    SCALE←((N+1),(M+N))ρ(Nρ2),(Mρ1) ASCALES ELEMENT VALUES IF REQ'D.
[83]    METRICVECTOR←GENERATIONVECTOR←(NG+1)ρ0
[84] A
[85]    SYSTEM←¯1+?((N+1),(N+M))ρ(L+1) ACHOOSE RANDOM POS ELEMENTS
[86]    AMIN←A←-(SYSTEM[ιN;ιN]×~(N,N)ρ1,Nρ0) ANEG SUBMATRIX WITH ZERO DIAGONAL.
[87]    BMIN←B←(2×SYSTEM[ιN;(N+ιM)]) APOS SUBMATRIX.
[88]    CMIN←C←-((1,N)ρSYSTEM[(N+1);ιN]) ANEG SUBMATRIX.
[89]    DMIN←D←(2×(1,M)ρSYSTEM[(N+1);(N+ιM)]) APOS SUBMATRIX.
[90]    SYSTEM[ιN;ιN]←A AREVISE SYSTEM.
[91]    SYSTEM[ιN;(N+ιM)]←B
[92]    SYSTEM[(N+1);ιN]←C AREVISE SYSTEM.
[93]    SYSTEM[(N+1);(N+ιM)]←D
[94] AXXXXXXXXXXXXXXXXXXXXXXXXXXXXXXXX

∇MAKECOPIES[⎕]∇
[0]    MAKECOPIES
[1] A
[2] AINPUT= SYSTEM
[3] AOUTPUT=SYSTEMC,ACOPY,BCOPY,CCOPY,DCOPY
[4]    COLINDEX←1=?(M+N)ρP
[5]    MTEMP1←((N+1),(M+N))ρ0
[6]    MTEMP1←MTEMP1+((N+1),(M+N))ρCOLINDEX
[7]    MTEMP2←¯1+?(1+MTEMP1×L)
[8]    STRING←×(¯1.5+?(N+M)ρ2)
[9]    COLSIGN←COLINDEX×STRING
```

```
[10]    MTEMP2←MTEMP2×((N+1),(M+N))ρCOLSIGN
[11]    SYSTEMC←SYSTEM×~MTEMP1
[12]    SYSTEMC←SYSTEMC+MTEMP2
[13]    ACOPY←SYSTEMC[ιN;ιN]×~(N,N)ρ1,Nρ0
[14]    BCOPY←SYSTEMC[ιN;(N+ιM)]
[15]    CCOPY←SYSTEMC[(N+1);ιN]
[16]    DCOPY←SYSTEMC[(N+1);(N+ιM)]

∇SOLVEQU[□]∇
[0]     SOLVEQU
[1]     ⍝xxxxxxxxxxxxxxxxxxxxxxxxxxxxxxxx
[2]     ⍝SOLVES: X=Af(X)+Bf(I)
[3]     ⍝xxxxxxxxxxxxxxxxxxxxxxxxxxxxxxxx
[4]     INPUT←(M,1)ρPATTERN[KKK;;] ⍝MAP 2D→1D
[5]     ⍝xxxxxxxxxxxxxxxxxxxxxxxxxxxxxxxx
[6]     ⍝COMPUTE CONSTANT TERM
[7]     ⍝INITIAL GUESS IS FIRST TWO TERMS
[8]     ⍝OF OPERATOR DECOMPOSITION SOLUTION
[9]     ⍝xxxxxxxxxxxxxxxxxxxxxxxxxxxxxxxx
[10]    ⍝ X0←TEMP1←BCOPY+.×(STEP INPUT)
[11]    →X0←TEMP1←BCOPY+.×(SATURATE1 INPUT)
[12]    →X1←ACOPY+.×(STEP X0)
[13]    XOLD←X0+X1
[14]    ⍝
[15]    TK←0
[16]    LOOP1:
[17]    TEMP2←ACOPY+.×(STEP XOLD)
[18]    XNEW←(TEMP2+TEMP1)
[19]    DELTAX←XNEW-XOLD
[20]    ⍝xxxxxxxxxxxxxxxxxxxxxxxxxxxxxxxx
[21]    ⍝CONVERGENCE TEST
[22]    ⍝xxxxxxxxxxxxxxxxxxxxxxxxxxxxxxxx
[23]    MAXERROR←+/|,DELTAX
[24]    →(MAXERROR=0)/END
[25]    ⍝
[26]    TK←TK+1
[27]    XOLD←XNEW
[28]    →(TK≤10)/LOOP1
[29]    END:

∇STEP[□]∇
[0]     Z←STEP X
[1]     Z←⌈(1⌊(0⌈X))

∇SATURATE1[□]∇
[0]     Z←SATURATE1 X
[1]     Z←1⌊(0⌈X)

∇OUTPUT[□]∇
[0]     OUTPUT
[1]     ⍝
[2]     OUT1←CCOPY+.×(STEP XNEW)
[3]     ⍝ OUT2←DCOPY+.×(STEP INPUT)
[4]     OUT2←DCOPY+.×(SATURATE1 INPUT)
[5]     S[KKK]←OUT1+OUT2
[6]     ⍝S←OUT1+OUT2

∇SELECT[□]∇
[0]     SELECT
[1]     ⍝METRIC
[2]     ⍝ METRIC←+/~(S=T)
[3]     ⍝METRIC←+/~((TLO≤S)∧(S≤THI))
[4]     METRIC←(+/~THI≤S[PASS])+(+/~TLO≥S[STOP])
[5]     →(METRIC≥MINMETRIC)/DONE
[6]     AMIN←ACOPY
[7]     BMIN←BCOPY
[8]     CMIN←CCOPY
```

```
[9]   DMIN←DCOPY
[10]  MINMETRIC←METRIC    ←
[11]  DONE:
      ~~RSOLUTION←~~
~~DEFN ERROR~~
      ∇SOLUTION[◻]∇
[0]   SOLUTION
[1]   ACHECKS FINAL SOLUTION
[2]   ACOPY←A
[3]   BCOPY←B
[4]   CCOPY←C
[5]   DCOPY←D
[6]   KKK←1
[7]   LOOP:
[8]   SOLVEQU
[9]   OUTPUT
[10]  KKK←KKK+1
[11]  →(KKK≤NPATTERN)/LOOP

∇DESIGNA[◻]∇
[0]   DESIGNA
[1]   AXXXXXXXXXXXXXXXXXXXXXXXXXXXXXXXXXXXXXXXX
[2]   APRGM DESIGNS MULTI-INPUT, SINGLE OUTPUT NN'S.
[     AXXXXXXXXXXXXXXXXXXXXXXXXXXXXXXXXXXXXXXXX
[4]   AM= INPUT DIMENSION
[5]   AN= NUMBER OF HIDDEN NEURONS
[6]   A
[7]   ANPATTERN= NUMBER OF TRAINING  PATTERNS
[8]   APATTERN[K;;]= INDEXED SET OF TRAINING PATTERNS
[9]   AT= TARGET SEQUENCE
[10]  ATHI= TARGET SEQUENCE UPPER BOUND
[11]  ATLO= TARGET SEQUENCE LOWER BOUND
[12]  AD= METRIC
[13]  A
[14]  AL= RANGE OF INITIAL VALUES FOR A,B,C MATRIX ELEMENTS
[15]  ARANGE= -L,...,0,1,...,L
[16]  AP= 1/PROBABILITY OF AN ELEMENT CHANGE
[17]  ANC= NUMBER OF COPIES PER GENERATION
[18]  ANG= NUMBER OF GENERATIONS
[19]  A
[20]  AINITIALIZE
[21]  A
[22]  INITIA    ← CK for A
[23]  A                                   START← DTS
[24]  FRACTION←TRYCOUNT←SOLVECOUNT←ABORTCOUNT←1
[25]  K←1
[26]  AXXXXXXXXXXXXXXXXXXXXXXXXXXXXXXXXXXXXX
[27]  A-----------GENERATION LOOP--------------
[   ] AXXXXXXXXXXXXXXXXXXXXXXXXXXXXXXXXXXXXX
[   ] GLOOP:
[30]  A
[31]  KK←1
[32]  AXXXXXXXXXXXXXXXXXXXXXXXXXXXXXXXXXXXXX
[33]  A---------------COPY LOOP-----------------
[34]  AXXXXXXXXXXXXXXXXXXXXXXXXXXXXXXXXXXXXX
[35]  CLOOP:
[36]  MAKECOPIES
[37]  A
[38]  KKK←1
[39]  AXXXXXXXXXXXXXXXXXXXXXXXXXXXXXXXXXXXXX
[40]  A-------------TRAINING LOOP---------------
[41]  AXXXXXXXXXXXXXXXXXXXXXXXXXXXXXXXXXXXXX
[42]  TLOOP: ATRAINING LOOP
[43]  TRYCOUNT←TRYCOUNT+1
[44]  SOLVEQU
[45]  AXXXXXXXXXXXXXXXXXXXXXXXXXXXXXXXXXXXXX
[46]  A-----------TEST FOR SOLUTION-----------
[47]  AXXXXXXXXXXXXXXXXXXXXXXXXXXXXXXXXXXXXX
[48]  →(TK≤10)/CONTINUE
```

```
[49]    □←' '
[50]    □←'SYSTEM NOT SOLVED'
[51]    □←'GENERATION= ',⍕K
[52]    □←'COPY=',⍕KK
[ .     □←'PATTERN=',⍕KKK
[54]    □←'ABORTCOUNT=',⍕ABORTCOUNT
[55]    FRACTION←SOLVECOUNT÷TRYCOUNT
[56]    □←'FRACTION OF COPIES SOLVED= ',⍕FRACTION
[57]    ABORTCOUNT←ABORTCOUNT+1
[58]    →(ABORTCOUNT>20000)/END
[59]    →CLOOP
[60]    CONTINUE:
[61]    SOLVECOUNT←SOLVECOUNT+1
[62]    OUTPUT
[63]    KKK←KKK+1
[64]    ₳xxxxxxxxxxxxxxxxxxxxxxxxxxxxxxxxxxxxx
[65]    ₳-------------END TRAINING---------------
[66]    ₳xxxxxxxxxxxxxxxxxxxxxxxxxxxxxxxxxxxxx
[67]    →(KKK≤NPATTERN)/TLOOP
[68]    ₳xxxxxxxxxxxxxxxxxxxxxxxxxxxxxxxxxxxxx
[69]    ₳-----------SELECT SURVIVOR--------------
[70]    ₳xxxxxxxxxxxxxxxxxxxxxxxxxxxxxxxxxxxxx
[71]    SELECT
[72]    →(MINMETRIC=0)/END
[73]    KK←KK+1
[74]    →(KK≤NC)/CLOOP
[75]    ₳xxxxxxxxxxxxxxxxxxxxxxxxxxxxxxxxxxxxx
[76]    ₳-------------END COPIES-----------------
[77]    ₳xxxxxxxxxxxxxxxxxxxxxxxxxxxxxxxxxxxxx
[78]    SYSTEM[⍳N;⍳N]←A←AMIN
[79]    SYSTEM[⍳N;(N+⍳M)]←B←BMIN
[80]    SYSTEM[(N+1);⍳N]←C←CMIN
[81]    SYSTEM[(N+1);(N+⍳M)]←D←DMIN
[82]    SYSMETRIC←MINMETRIC
[83]    □←' '
[84]    □←'GENERATION COMPLETED. NUMBER= ',⍕K
[85]    □←'METRIC= ',⍕SYSMETRIC
[86]    □←' '
[87]    GENERATIONVECTOR[K]←K
[88]    METRICVECTOR[K]←SYSMETRIC
[89]    ₳xxxxxxxxxxxxxxxxxxxxxxxxxxxxxxxxxxxxx
[90]    ₳-------------END GENERATIONS------------
[91]    ₳xxxxxxxxxxxxxxxxxxxxxxxxxxxxxxxxxxxxx
[92]    K←K+1
[93]    →(K≤NG)/GLOOP
[94]    ₳xxxxxxxxxxxxxxxxxxxxxxxxxxxxxxxxxxxxx
[95]    ₳-----------FINAL OUTPUT-----------------
[96]    ₳xxxxxxxxxxxxxxxxxxxxxxxxxxxxxxxxxxxxx
[97]    END:
[98]    SYSTEM[⍳N;⍳N]←A←AMIN
[99]    SYSTEM[⍳N;(N+⍳M)]←B←BMIN
[100]   SYSTEM[(N+1);⍳N]←C←CMIN
[101]   SYSTEM[(N+1);(N+⍳M)]←D←DMIN
[102]   SYSMETRIC←MINMETRIC
[103]   □←' '
[104]   □←'FINAL SYSTEM: GENERATION = ',⍕K
[105]   □←'METRIC = ',⍕SYSMETRIC
[106]   GENERATIONVECTOR[K]←K
[107]   METRICVECTOR[K]←SYSMETRIC
        STOP←⎕TS ∇INITIAL[⎕]∇
[0]     INITIAL
[1]     ₳M←9
[2]     ₳N←1
[ ]     ₳
[4]     ₳NPATTERN←4
[5]     ₳PATTERN←(NPATTERN,3,3)⍴1
```

```
[6]   ⍝ PATTERN[1;;]←HOR
[7]   ⍝ PATTERN[2;;]←DIAGUP
[8]   ⍝ PATTERN[3;;]←VER
[9]   ⍝ PATTERN[4;;]←DIAGDN
[10]  ⍝ T← 5 1 0 1
[11]  ⍝ THI← 6 2 1 2
[12]  ⍝ TLO← 4 0 ¯1 0
[13]  ⍝METRIC←S←(NPATTERN)⍴0
[14]  ⍝SYSMETRIC←MINMETRIC←5
[15]   M←49
[16]   N←25
[17]   NPATTERN←12
[18]  ⍝ NPATTERN←4
[19]   PATTERN←(NPATTERN,7,7)⍴1
[20]   PATTERN[1;;]←HOR1
[21]   PATTERN[2;;]←HOR2
[22]   PATTERN[3;;]←HOR3
[23]   PATTERN[4;;]←DIAGUP1
[23]   PATTERN[4;;]←DIAGUP1
[24]   PATTERN[5;;]←DIAGUP2
[25]   PATTERN[6;;]←DIAGUP3
[26]   PATTERN[7;;]←VER1
[27]   PATTERN[8;;]←VER2
[28]   PATTERN[9;;]←VER3
[29]   PATTERN[10;;]←DIAGDN1
[30]   PATTERN[11;;]←DIAGDN2
[31]   PATTERN[12;;]←DIAGDN3
[32]   T← 1 1 1 10 10 10 1 1 1 0 0 0
[33]   THI← 4 4 4 20 20 20 4 4 4 4 4 4
[34]   TLO← ¯10 ¯10 ¯10 7 7 7 ¯10 ¯10 ¯10 ¯10 ¯10 ¯10
[35]  ⍝ T← 10 1 0 1
[36]  ⍝ THI←T+3
[37]  ⍝ TLO←T-3
[38]  ⍝ M←2
[39]  ⍝ N←3
[40]  ⍝ NPATTERN←4
[41]  ⍝ PATTERN←(NPATTERN,1,2)⍴1
[42]  ⍝ PATTERN[1;;]← 1 2 ⍴ 0 0
[43]  ⍝ PATTERN[2;;]← 1 2 ⍴ 0 1
[44]  ⍝ PATTERN[3;;]← 1 2 ⍴ 1 0
[45]  ⍝ PATTERN[4;;]← 1 2 ⍴ 1 1
[46]  ⍝ T← 0 6 6 0
[47]  ⍝ THI←T+2
[42]  ⍝ PATTERN[1;;]← 1 2 ⍴ 0 0
[43]  ⍝ PATTERN[2;;]← 1 2 ⍴ 0 1
[44]  ⍝ PATTERN[3;;]← 1 2 ⍴ 1 0
[45]  ⍝ PATTERN[4;;]← 1 2 ⍴ 1 1
[46]  ⍝ T← 0 6 6 0
[47]  ⍝ THI←T+2
[48]  ⍝ TLO←T-2
[49]   MINMETRIC←NPATTERN
[50]   S←(NPATTERN)⍴0
[51]  ⍝
[52]   L←10
[53]   P←3
[54]   NC←10
[55]   NG←200
[56]   METRICVECTOR←GENERATIONVECTOR←(NG+1)⍴0
[57]  ⍝
[58]   SYSTEM←¯1+?((N+1),(N+M))⍴(L+1)
[59]   COL←×(¯1.5+?(N+M)⍴2)
[60]   SYSTEM←SYSTEM×((N+1),(N+M))⍴COL
[61]   AMIN←A←SYSTEM[⍳N;⍳N]×~(N,N)⍴1,N⍴0
[62]   BMIN←B←SYSTEM[⍳N;(N+⍳M)]
[63]   CMIN←C←(1,N)⍴SYSTEM[(N+1);⍳N]
[64]   DMIN←D←(1,M)⍴SYSTEM[(N+1);(N+⍳M)]
[65]   SYSTEM[⍳N;⍳N]←A
```

```
        ∇MAKECOPIES[◊]∇
[       MAKECOPIES
[1]     ⍝
[2]     ⍝INPUT= SYSTEM
[3]     ⍝OUTPUT=SYSTEMC,ACOPY,BCOPY,CCOPY,DCOPY
[4]     COLINDEX←1=?(M+N)⍴P
[5]     MTEMP1←((N+1),(M+N))⍴0
[6]     MTEMP1←MTEMP1+((N+1),(M+N))⍴COLINDEX
[7]     MTEMP2←¯1+?(1+MTEMP1×L)
[8]     STRING←×(¯1.5+?(N+M)⍴2)
[9]     COLSIGN←COLINDEX×STRING
[10]    MTEMP2←MTEMP2×((N+1),(M+N))⍴COLSIGN
[11]    SYSTEMC←SYSTEM×~MTEMP1
[12]    SYSTEMC←SYSTEMC+MTEMP2
[13]    ACOPY←SYSTEMC[⍳N;⍳N]×~(N,N)⍴1,N⍴0
[14]    BCOPY←SYSTEMC[⍳N;(N+⍳M)]
[15]    CCOPY←SYSTEMC[(N+1);⍳N]
[16]    DCOPY←SYSTEMC[(N+1);(N+⍳M)]

∇SOLVEQU[◊]∇
[0]     SOLVEQU
[1]     ⍝xxxxxxxxxxxxxxxxxxxxxxxxxxxxxxxxx
[2]     ⍝SOLVES: X=Af(X)+Bf(I)
[      ⍝xxxxxxxxxxxxxxxxxxxxxxxxxxxxxxxxx
[4]     ⍝
[5]     ⍝
[6]     ⍝xxxxxxxxxxxxxxxxxxxxxxxxxxxxxxxxx
[7]     ⍝MAP 2D→1D
[8]     ⍝xxxxxxxxxxxxxxxxxxxxxxxxxxxxxxxxx
[9]     INPUT←(M,1)⍴PATTERN[KKK;;]
[10]    ⍝xxxxxxxxxxxxxxxxxxxxxxxxxxxxxxxxx
[11]    ⍝COMPUTE CONSTANT TERM
[12]    ⍝INITIAL GUESS IS FIRST TWO TERMS
[13]    ⍝OF OPERATOR DECOMPOSITION SOLUTION
[14]    ⍝xxxxxxxxxxxxxxxxxxxxxxxxxxxxxxxxx
[15]    X0←TEMP1←BCOPY+.×⌈(1⌊(0⌈INPUT))
[16]    X1←ACOPY+.×⌈(1⌊(0⌈X0))
[17]    XOLD←X0+X1
[18]    ⍝
[19]    TK←0
[20]    LOOP1:
[21]    TEMP2←ACOPY+.×⌈(1⌊(0⌈XOLD))
[22]    XNEW←(TEMP1+TEMP2)
[23]    DELTAX←XNEW-XOLD
[24]    ⍝xxxxxxxxxxxxxxxxxxxxxxxxxxxxxxxxxxx
[25]    ⍝CONVERGENCE TEST
[26]    ⍝xxxxxxxxxxxxxxxxxxxxxxxxxxxxxxxxxxx
[27]    MAXERROR←+/|,DELTAX
[--]    →(MAXERROR=0)/END
[--]    ⍝
[30]    ⍝
[31]    ⍝
[32]    TK←TK+1
[33]    XOLD←XNEW
[34]    →(TK≤10)/LOOP1
[35]    END:

∇OUTPUT[◊]∇
[0]     OUTPUT
[1]     ⍝
[2]     OUT1←CCOPY+.×⌈(1⌊(0⌈XNEW))
[3]     OUT2←DCOPY+.×⌈(1⌊(0⌈INPUT))
[4]     S[KKK]←OUT1+OUT2
```

```
    ∇SELECT[□]∇
[0]  SELECT
[1]  ⍝METRIC
[2]  ⍝ METRIC←+/~(S=T)
[3]   METRIC←+/~((TLO≤S)∧(S≤THI))
[4]   →(METRIC≥MINMETRIC)/DONE
[5]   AMIN←ACOPY
[6]   BMIN←BCOPY
[7]   CMIN←CCOPY
[8]   DMIN←DCOPY
[9]   MINMETRIC←METRIC
[10] DONE:

∇SOLUTION[□]∇
[0]  SOLUTION
[1]  ⍝CHECKS FINAL SOLUTION
[2]   ACOPY←A
[3]   BCOPY←B
[4]   CCOPY←C
[5]   DCOPY←D
[6]   KKK←1
[7]  LOOP:
[8]   SOLVEQU
[9]   OUTPUT
[10]  KKK←KKK+1
[11]  →(KKK≤NPATTERN)/LOOP

∇TPATTERN2[□]∇
[0]  TPATTERN2
[1]  ⍝GENERATES 7×7 TRAINING PATTERNS
[2]   HOR1← 7 7 ⍴(21⍴0),(7⍴1)
[3]   HOR2← 7 7 ⍴(22⍴0),(5⍴1)
[4]   HOR3← 7 7 ⍴(23⍴0),(3⍴1)
[5]   VER1←⍉HOR1
[6]   VER2←⍉HOR2
[7]   VER3←⍉HOR3
[8]   DIAGDN1← 7 7 ⍴1,(7⍴0)
[9]   DIAGDN2←DIAGDN1
[10]  DIAGDN2[1;1]←DIAGDN2[7;7]←0
[11]  DIAGDN3←DIAGDN2
[12]  DIAGDN3[2;2]←DIAGDN3[6;6]←0
[13]  DIAGUP1←⊖DIAGDN1
[14]  DIAGUP2←⊖DIAGDN2
[15]  DIAGUP3←⊖DIAGDN3

∇SUMMARY[□]∇
[0]  SUMMARY
[1]  ⍝PRGM OUTPUTS A NN DESIGN SUMMARY.
[2]   □←' '
[3]   □←'NUMBER OF INPUT NEURONS(M) = ',⍕M
[4]   □←'NUMBER OF HIDDEN NEURONS(N) = ',⍕N
[5]   □←'NUMBER OF OUTPUT NEURONS(O) = ',⍕1
[6]   □←'NUMBER OF COPIES PER GENERATION(NC) = ',⍕NC
[7]   □←'NUMBER OF PATTERNS(NPATTERN) = ',⍕NPATTERN
[8]   □←'RANGE OF ELEMENT VALUES(L) 0,+/-1,....,+/-L, L= ',⍕L
[9]   □←'1/PROBABILITY OF ELEMENT CHANGE(P) = ',⍕P
[10]  □←'NN TYPE: TYPES 1&2'
[11]  □←' '
[12]  □←'METRIC:'
[13]  □←'THI = ',⍕THI
[14]  □←'TARGET SEQUENCE(T) = ',⍕T
[15]  □←'TLO = ',⍕TLO
[16]  □←' '
[17]  SOLUTION
[18]  □←'SOLUTION(S) = ',⍕S
[19]  □←'TOTAL NUMBER OF TRIES(TRYCOUNT) = ',⍕TRYCOUNT
[20]  □←'FRACTION OF TRIES SOLVED(FRACTION) = ',⍕FRACTION
```

```
[21]  □←'NUMBER OF GENERATIONS(K) = ',⍕K
[22]  □←'METRIC TIME HISTORY: 0 THROUGH K'
[23]  METRICVECTOR[⍳K]
[24]  □←'LAPSE TIME (DAYS-HRS-MINUTES) = ',⍕3↑2↓(STOP-START)
[25]  □←'COMPLETION TIME STAMP: ',⍕STOP
```

∇DESIGNB[□]∇

```
[0]   DESIGNB
[1]   ⍝xxxxxxxxxxxxxxxxxxxxxxxxxxxxxxxxxxxxxxxxxxxxxxx
[2]   ⍝PRGM COMPUTES THE OUTPUT FEATURE SPECTRUM OF A PATTERN SET.
[3]   ⍝xxxxxxxxxxxxxxxxxxxxxxxxxxxxxxxxxxxxxxxxxxxxxxx
[4]   ⍝TIENO= TIE NUMBER FOR INPUT FILE.
[5]   ⍝M= INPUT DIMENSION.
[6]   ⍝N= NUMBER OF HIDDEN NEURONS.
[7]   ⍝NPATTERN= NUMBER OF TRAINING PATTERNS.
[8]   ⍝STEPS FOR ACCESSING FILE:
[9]   ⍝BEFORE RUNNING PRGM DO: 'NNFILES'⎕FTIE 1.
[10]  ⍝
[11]  ⍝xxxxxxxxxxxxxxxxxxxxxxxxxxxxxxxxxxxx
[12]  ⍝INITIALIZE SYSTEM
[13]  ⍝xxxxxxxxxxxxxxxxxxxxxxxxxxxxxxxxxxxx
[14]  ⍝
[15]     INITIALB  ⍝ Ck for A
[16]  ⍝
[17]  ⍝xxxxxxxxxxxxxxxxxxxxxxxxxxxxxxxxxxxx
[18]  ⍝PATTERN LOOP
[19]  ⍝xxxxxxxxxxxxxxxxxxxxxxxxxxxxxxxxxxxx
[20]     K←1
[21]  PLOOP:
[22]  ⍝
[23]  ⍝xxxxxxxxxxxxxxxxxxxxxxxxxxxxxxxxxxxx
[24]  ⍝FEATURE LOOP
[25]  ⍝xxxxxxxxxxxxxxxxxxxxxxxxxxxxxxxxxxxx
[26]     KK←1
[27]  FLOOP:
[28]     ACTIVITY
[.]      →(TK≤10)/CONTINUE
[30]  ⍝ □←' '
[31]  ⍝ □←'SYSTEM NOT SOLVED'   S←0
[32]  ⍝ □←'PATTERN= ',⍕K
[33]  ⍝ □←'FEATURE= ',⍕KK
[34]  ⍝ →END
[35]  CONTINUE:
[36]     OUTPUTB
[37]     SPECTRUM[K;KK;1]←S
[38]     KK←KK+1
[39]     →(KK≤4)/FLOOP
[40]     K←K+1
[41]     →(K≤NPATTERN)/PLOOP
[42]     □←' '
[43]     □←'SPECTRUM CALCULATION COMPLETED'
[44]  END:
[45]
```

∇INITIALB[□]∇

```
[0]   INITIALB
[1]   ⍝READ DATA FROM A FILE.
[2]      TIENO←1
[3]      SYSTEM1←⎕FREAD TIENO,1 ⍝DIAGUP & DIAGDN.
[4]      SYSTEM2←⎕FREAD TIENO,2 ⍝HOR & VER.
[5]   ⍝
[6]      M←49
[7]      N←25
[8]   ⍝DEFINE DETECTOR SYSTEM.
[9]      A1←SYSTEM1[⍳N;⍳N]
[10]     B1←SYSTEM1[⍳N;(N+⍳M)]
[11]     C1←SYSTEM1[(N+1);⍳N]
[12]     D1←SYSTEM1[(N+1);(N+⍳M)]
```

```
[13]  A
[14]  A2←SYSTEM2[ιN;ιN]
[15]  B2←SYSTEM2[ιN;(N+ιM)]
[16]  C2←SYSTEM2[(N+1);ιN]
[17]  D2←SYSTEM2[(N+1);(N+ιM)]
[18]  A
[19]  NPATTERN←16      6 initially
[20]  K←KK←1
[21]  SPECTRUM←(NPATTERN,4,1)ρ1

∇ACTIVITY[□]∇
[0]  ACTIVITY
[1]    →(KK=1)/L1
[2]    →(KK=2)/L2
[3]    →(KK=3)/L3
[4]    →(KK=4)/L4
[5]  A
[6]  L1: AHORIZONTAL
[7]    INPUT←(M,1)ρPATTERN[K;;]
[8]    ATEMP←A2
[9]    BTEMP←B2
[10]   →ITERATE
[11] A
[12] L2: ADIAGUP
[13]   INPUT←(M,1)ρPATTERN[K;;]
[14]   ATEMP←A1
[15]   BTEMP←B1
[16]   →ITERATE
[17] A
[18] L3: AVERTICAL
[19]   INPUT←(M,1)ρΦQPATTERN[K;;]
[20]   ATEMP←A2
[21]   BTEMP←B2
[22]   →ITERATE
[23] A
[24] L4: ADIAGDN
[25]   INPUT←(M,1)ρΦQPATTERN[K;;]
[26]   ATEMP←A1
[27]   BTEMP←B1
[28]   →ITERATE
[29]  A
[30] ITERATE:
[31]   X0←TEMP1←BTEMP+.×⌈(1⌊(0⌈INPUT))
[32]   X1←ATEMP+.×⌈(1⌊(0⌈X0))
[33]   XOLD←X0+X1
[34]   TK←0
[35] LOOP1:
[36]   TEMP2←ATEMP+.×⌈(1⌊(0⌈XOLD))
[37]   XNEW←(TEMP1+TEMP2)
[38]   DELTAX←XNEW-XOLD
[39]   MAXERROR←+/|,DELTAX
[40]   →(MAXERROR=0)/END
[41]   TK←TK+1
[42]   XOLD←XNEW
[43]   →(TK≤10)/LOOP1
[44] END:

∇OUTPUTB[□]∇
[0]  OUTPUTB
[1]    →((KK=1)∨(KK=3))/L1
[2]    →((KK=2)∨(KK=4))/L2
[3]  A
[4]  L1:
[5]    CTEMP←C2
[6]    DTEMP←D2
[7]    →OUT
[8]  A
[9]  L2:
```

```
[10]    CTEMP←C1
[11]    DTEMP←D1
[12]    →OUT
[13]    ⍝
[14] OUT:
[15]    OUT1←CTEMP+.×⌈(1⌊(0⌈XNEW))
[16]    OUT2←DTEMP+.×⌈(1⌊(0⌈INPUT))
[17]    S←OUT1+OUT2
```

∇PRINTB[□]∇

```
[0]     PRINTB
[1]     SLOPE←'  --  //  ||  \\'
[2]     K←9
[3]  LOOP:
[4]     □←' '
[5]     □←'P',⍕K
[6]     □←PATTERN[K;;]
[7]     □←' '
[8]     □←⍕SPECTRUM[K;⍳4;]
[9]     □←SLOPE
[10]    □←' '
[11]    K←K+1
[12]    →(K≤16)/LOOP
```

∇TPATTERN3[□]∇

```
[0]     TPATTERN3
[1]     ⍝DEFINES (16) PATTERNS FOR RESPONSE MODULE DESIGN.
[2]     PATTERN←(16,7,7)⍴0
[3]     P1←P3←P9← 7 7 ⍴0
[4]     M←⌽ 9 9 ⍴1,(9⍴0)
[5]     P1←M[1+⍳7;⍳7]
[6]     P1[7;2]←0
[7]     P3←M[⍳7;⍳7]
[8]     P9←M[2+⍳7;1+⍳7]
[9]     P9[6;1]←0
[10]    P11←M[2+⍳7;2+⍳7]
[11]    PATTERN[1;;]←P1
[12]    PATTERN[2;;]←⊖P1
[13]    PATTERN[3;;]←P3
[14]    PATTERN[4;;]←⊖P3
[15]    PATTERN[5;;]←⌽P1
[16]    PATTERN[6;;]←⌽⊖P1
[17]    PATTERN[7;;]←⌽P3
[18]    PATTERN[8;;]←⌽⊖P3
[19]    PATTERN[9;;]←P9
[20]    PATTERN[10;;]←⌽P9
[21]    PATTERN[11;;]←P11
[22]    PATTERN[12;;]←⌽P11
[23]    PATTERN[13;;]←⊖P9
[24]    PATTERN[14;;]←⌽⊖P9
[25]    PATTERN[15;;]←⊖P11
[26]    PATTERN[16;;]←⌽⊖P11
```

∇DESIGNC[□]∇

```
[0]     DESIGNC
[1]     ⍝xxxxxxxxxxxxxxxxxxxxxxxxxxxxxxxxxxxxxxxxxxxx
[2]     ⍝PRGM DESIGNS MULTI-INPUT, MULTI-OUTPUT NN'S.
[3]     ⍝xxxxxxxxxxxxxxxxxxxxxxxxxxxxxxxxxxxxxxxxxxxx
[4]     ⍝M= NUMBER OF INPUT NEURONS
[5]     ⍝N= NUMBER OF HIDDEN NEURONS
[6]     ⍝O= NUMBER OF OUTPUT NEURONS
[7]     ⍝
[8]     ⍝NPATTERN= NUMBER OF TRAINING  PATTERNS
[9]     ⍝PATTERN[K;;]= INDEXED SET OF TRAINING PATTERNS
[10]    ⍝T= TARGET SEQUENCE
[11]    ⍝THI= TARGET SEQUENCE UPPER BOUND
[12]    ⍝TLO= TARGET SEQUENCE LOWER BOUND
[13]    ⍝D= METRIC
```

```
[14] A
[15] AL= RANGE OF INITIAL VALUES FOR A,B,C MATRIX ELEMENTS
[16] ARANGE= -L,...,0,1,...,L
[17] AP= 1/PROBABILITY OF AN ELEMENT CHANGE
[18] ANC= NUMBER OF COPIES PER GENERATION
[19] ANG= NUMBER OF GENERATIONS
[20] A
[21] AINITIALIZE
[22] A
[23] INITIALC        ← ch for *
[24] A
[25]    FRACTION←TRYCOUNT←SOLVECOUNT←ABORTCOUNT←1
[26]    K←1
[27] AXXXXXXXXXXXXXXXXXXXXXXXXXXXXXXXXXXXXX
[28] A-----------GENERATION LOOP--------------
[29] AXXXXXXXXXXXXXXXXXXXXXXXXXXXXXXXXXXXXX
[30] GLOOP:
[31] A
[32]    KK←1
[33] AXXXXXXXXXXXXXXXXXXXXXXXXXXXXXXXXXXXXX
[34] A--------------COPY LOOP-----------------
[35] AXXXXXXXXXXXXXXXXXXXXXXXXXXXXXXXXXXXXX
[36] CLOOP:
[37] MAKECOPIESC
[38] A
[39]    KKK←1
[40] AXXXXXXXXXXXXXXXXXXXXXXXXXXXXXXXXXXXXX
[41] A------------TRAINING LOOP---------------
[42] AXXXXXXXXXXXXXXXXXXXXXXXXXXXXXXXXXXXXX
[43] TLOOP: ATRAINING LOOP
[44]    TRYCOUNT←TRYCOUNT+1
[45] SOLVEQU
[46] AXXXXXXXXXXXXXXXXXXXXXXXXXXXXXXXXXXXXX
[47] A-----------TEST FOR SOLUTION------------
[48] AXXXXXXXXXXXXXXXXXXXXXXXXXXXXXXXXXXXXX
[49]    →(TK≤10)/CONTINUE
[50]    ☐←' '
[51]    ☐←'SYSTEM NOT SOLVED'
[52]    ☐←'GENERATION= ',⍕K
[53]    ☐←'COPY=',⍕KK
[54]    ☐←'PATTERN=',⍕KKK
[55]    ☐←'ABORTCOUNT=',⍕ABORTCOUNT
[56]    FRACTION←SOLVECOUNT÷TRYCOUNT
[57]    ☐←'FRACTION OF COPIES SOLVED= ',⍕FRACTION
[58]    ABORTCOUNT←ABORTCOUNT+1
[59]    →(ABORTCOUNT>20000)/END
[60]    →CLOOP
[61] CONTINUE:
[62]    SOLVECOUNT←SOLVECOUNT+1
[63] OUTPUTC
[64]    KKK←KKK+1
[65] AXXXXXXXXXXXXXXXXXXXXXXXXXXXXXXXXXXXXX
[66] A--------------END TRAINING----------------
[67] AXXXXXXXXXXXXXXXXXXXXXXXXXXXXXXXXXXXXX
[68]    →(KKK≤NPATTERN)/TLOOP
[69] AXXXXXXXXXXXXXXXXXXXXXXXXXXXXXXXXXXXXX
[70] A-----------SELECT SURVIVOR--------------
[71] AXXXXXXXXXXXXXXXXXXXXXXXXXXXXXXXXXXXXX
[72]    SELECTC
[73]    →(MINMETRIC=0)/END
[74]    KK←KK+1
[75]    →(KK≤NC)/CLOOP
[76] AXXXXXXXXXXXXXXXXXXXXXXXXXXXXXXXXXXXXX
[77] A--------------END COPIES------------------
[78] AXXXXXXXXXXXXXXXXXXXXXXXXXXXXXXXXXXXXX
[79]    SYSTEM[⍳N;⍳N]←A←AMIN
[80]    SYSTEM[⍳N;(N+⍳M)]←B←BMIN
[81]    SYSTEM[(N+⍳O);⍳N]←C←CMIN
[82]    SYSTEM[(N+⍳O);(N+⍳M)]←D←DMIN
```

```
[83]    SYSMETRIC←MINMETRIC
[84]    □←' '
[85]    □←'GENERATION COMPLETED, NUMBER= ',⍕K
[86]    □←'METRIC= ',⍕SYSMETRIC
[87]    □←' '
[88]    GENERATIONVECTOR[K]←K
[89]    METRICVECTOR[K]←SYSMETRIC
[90]    ⍝xxxxxxxxxxxxxxxxxxxxxxxxxxxxxxxxxxxxxx
[91]    ⍝-----------END GENERATIONS-------------
[92]    ⍝xxxxxxxxxxxxxxxxxxxxxxxxxxxxxxxxxxxxxx
[93]    K←K+1
[94]    →(K≤NG)/GLOOP
[95]    ⍝xxxxxxxxxxxxxxxxxxxxxxxxxxxxxxxxxxxxxx
[96]    ⍝-----------FINAL OUTPUT----------------
[97]    ⍝xxxxxxxxxxxxxxxxxxxxxxxxxxxxxxxxxxxxxx
[98]    END:
[99]    SYSTEM[⍳N;⍳N]←A←AMIN
[100]   SYSTEM[⍳N;(N+⍳M)]←B←BMIN
[101]   SYSTEM[(N+⍳O);⍳N]←C←CMIN
[102]   SYSTEM[(N+⍳O);(N+⍳M)]←D←DMIN
[103]   SYSMETRIC←MINMETRIC
[104]   □←' '
[105]   □←'FINAL SYSTEM: GENERATION = ',⍕K
[106]   □←'METRIC = ',⍕SYSMETRIC
[107]   GENERATIONVECTOR[K]←K
[108]   METRICVECTOR[K]←SYSMETRIC ∇INITIALC[◊]∇
[0]     INITIALC
[1]     ⍝PRGM INITIALIZES MI/MO DESIGN ALGORITHM.
[2]     ⍝SYSTEM DIMENSIONS
[3]     M←4
[4]     N←10
[5]     O←2
[6]     ⍝INPUTS
[7]     NPATTERN←16
[8]     PATTERN←(NPATTERN,M,1)⍴1  ⍝ASSUMES INPUT IS Mx1 MATRIX.
[9]     PATTERN[1;;]←HOR1
[10]    PATTERN[2;;]←HOR2
[11]    PATTERN[3;;]←HOR3
[12]    PATTERN[4;;]←DIAGUP1
[13]    PATTERN[5;;]←DIAGUP2
[14]    PATTERN[6;;]←DIAGUP3
[15]    PATTERN[7;;]←VER1
[16]    PATTERN[8;;]←VER2
[17]    PATTERN[9;;]←VER3
[18]    PATTERN[10;;]←DIAGDN1
[19]    PATTERN[11;;]←DIAGDN2
[20]    PATTERN[12;;]←DIAGDN3
[21]    ⍝OUTPUTS
[22]    T1HI← T1+0.5
[23]    T1← 1 1 2 2 ¯1 ¯1 ¯2 ¯2 0 0 0 0 0 0 0 0    ⍝ ΔX
[24]    T1LO← T1-0.5
[25]    ⍝
[26]    T2HI← T2+.5
[27]    T2← 0 0 0 0 0 0 0 0 1 1 2 2 ¯1 ¯1 ¯2 ¯2    ⍝ Δy
[28]    T2LO← T2-.5
[29]    S←(2,NPATTERN)⍴0
[30]    ⍝SEARCH PARAMETERS
[31]    MINMETRIC←NPATTERN
[32]    L←10
[33]    P←3
[34]    NC←10
[35]    NG←200
[36]    METRICVECTOR←GENERATIONVECTOR←(NG+1)⍴0
[37]    ⍝DEFINE INITIAL SYSTEM
[38]    SYSTEM←¯1+?((N+O),(N+M))⍴(L+1)  ⍝CHOOSE RANDOM POS ELEMENTS.
[39]    COL←×(¯1.5+?(N+M)⍴2)  ⍝CHANGE SIGN OF RANDOM COLUMNS
```

PATTERN ← SPECTRUM

```
[40]  SYSTEM←SYSTEM×((N+O),(N+M))ρCOL ⍝GIVES POS & NEG ELEMENTS.
[41]  AMIN←A←SYSTEM[⍳N;⍳N]×~(N,N)ρ1,Nρ0 ⍝SUBMATRIX WITH ZERO DIAGONALS.
[42]  BMIN←B←SYSTEM[⍳N;(N+⍳M)] ⍝SUBMATRIX OF SYSTEM
[43]  CMIN←C←(O,N)ρSYSTEM[(N+O);⍳N] ⍝SUBMATRIX OF SYSTEM
[44]  DMIN←D←(O,M)ρSYSTEM[(N+O);(N+⍳M)] ⍝SUBMATRIX OF SYSTEM
[45]  SYSTEM[⍳N;⍳N]←A ⍝INCLUDES ZERO DIAGONALS IN SYSTEM

∇MAKECOPIESC[□]∇
[0]  MAKECOPIESC
[1]  ⍝
[2]  ⍝INPUT= SYSTEM
[3]  ⍝OUTPUT=SYSTEMC,ACOPY,BCOPY,CCOPY,DCOPY
[4]    COLINDEX←1=?(M+N)ρP
[5]    MTEMP1←((N+O),(M+N))ρ0
[6]    MTEMP1←MTEMP1+((N+O),(M+N))ρCOLINDEX
[7]    MTEMP2←¯1+?(1+MTEMP1×L)
[8]    STRING←×(¯1.5+?(N+M)ρ2)
[9]    COLSIGN←COLINDEX×STRING
[10]   MTEMP2←MTEMP2×((N+O),(M+N))ρCOLSIGN
[11]   SYSTEMC←SYSTEM×~MTEMP1
[12]   SYSTEMC←SYSTEMC+MTEMP2
[13]   ACOPY←SYSTEMC[⍳N;⍳N]×~(N,N)ρ1,Nρ0
[14]   BCOPY←SYSTEMC[⍳N;(N+⍳M)]
[15]   CCOPY←SYSTEMC[(N+O);⍳N]
[16]   DCOPY←SYSTEMC[(N+O);(N+⍳M)]

∇OUTPUTC[□]∇
[0]  OUTPUTC
[1]  ⍝
[2]   OUT1←CCOPY+.×⌈(1⌊(O⌈XNEW))
[3]   OUT2←DCOPY+.×⌈(1⌊(O⌈INPUT))
[4]   S[;KKK]←OUT1+OUT2

∇SELECTC[□]∇
[0]  SELECTC
[1]  ⍝METRIC FOR O=2.
[2]   METRIC1←+/~((T1LO≤S[1;])∧(S[1;]≤T1HI))
[3]   METRIC2←+/~((T2LO≤S[2;])∧(S[2;]≤T2HI))
[4]   METRIC←METRIC1+METRIC2
[5]  ⍝
[6]   →(METRIC≥MINMETRIC)/DONE
[7]   AMIN←ACOPY
[8]   BMIN←BCOPY
[9]   CMIN←CCOPY
[10]  DMIN←DCOPY
[11]  MINMETRIC←METRIC
[12] DONE:

∇SOLUTIONC[□]∇
[0]  SOLUTIONC
[1]  ⍝CHECKS FINAL SOLUTION
[2]   ACOPY←A
[3]   BCOPY←B
[4]   CCOPY←C
[5]   DCOPY←D
[6]   KKK←1
[7]  LOOP:
[8]   SOLVEQU
[9]   OUTPUTC
[10]  KKK←KKK+1
[11]  →(KKK≤NPATTERN)/LOOP
```

```
        ∇DESIGNE[□]∇
[0]  DESIGNE
[1]  ⍝XXXXXXXXXXXXXXXXXXXXXXXXXXXXXXXXXXXXXXXXXXXXXXXXX
[2]  ⍝PRGM COMPUTES THE OUTPUT FEATURE SPECTRUM FOR THE FINE ADJ MODULE.
[3]  ⍝XXXXXXXXXXXXXXXXXXXXXXXXXXXXXXXXXXXXXXXXXXXXXXXXX
[4]  ⍝TIENO= TIE NUMBER FOR INPUT FILE.
[5]  ⍝M= INPUT DIMENSION.
[6]  ⍝N= NUMBER OF HIDDEN NEURONS.
[7]  ⍝STEPS FOR ACCESSING FILE:
[8]  ⍝BEFORE RUNNING PRGM DO: 'NNFILES'⎕FTIE 2.
[9]  ⍝
[10] ⍝XXXXXXXXXXXXXXXXXXXXXXXXXXXXXXXXXXX
[11] ⍝INITIALIZE SYSTEM
[12] ⍝XXXXXXXXXXXXXXXXXXXXXXXXXXXXXXXXXXX
[13] ⍝
[14]   INITIALE
[15] ⍝
[16] ⍝XXXXXXXXXXXXXXXXXXXXXXXXXXXXXXXXXXX
[17] ⍝PATTERN LOOP
[18] ⍝XXXXXXXXXXXXXXXXXXXXXXXXXXXXXXXXXXX
[19] PLOOP:
[20]   ⎕←'ENTER → TO STOP'
[21]   ⎕←'ENTER HORIZONTAL SHIFT E.G. 2 OR ¯2'
[22]   SH←⎕
[23]   ⎕←'ENTER VERTICAL SHIFT'
[24]   PATTERN←SH SHIFT SV
[25] ⍝
[26] ⍝XXXXXXXXXXXXXXXXXXXXXXXXXXXXXXXXXXX
[27] ⍝FEATURE LOOP
[28] ⍝XXXXXXXXXXXXXXXXXXXXXXXXXXXXXXXXXXX
[29]   KK←1
[30] FLOOP:
[31]   ACTIVITE
[32]   →(TK≤10)/CONTINUE
[33]   S←0
[34]   →SKIP
[35] ⍝ ⎕←' '
[36] ⍝ ⎕←'SYSTEM NOT SOLVED'
[37] ⍝ ⎕←'FEATURE= ',⍕KK
[38] ⍝ →END
[39] CONTINUE:
[40]   OUTPUTE
[41] SKIP:SPECTRUM[KK;1]←S
[42]   KK←KK+1
[43]   →(KK≤4)/FLOOP
[44]   ⎕←' '
[45]   ⎕←'PATTERN ='
[46]   PATTERN
[47]   ⎕←'SPECTRUM ='
[48]   6 0 ⍕⍕SPECTRUM
[49]   ⎕←'NORTH SOUTH    EAST    WEST'
[50]   →PLOOP
[51] END:
[52]

∇DESIGNF[□]∇
[0]  DESIGNF
[1]  ⍝XXXXXXXXXXXXXXXXXXXXXXXXXXXXXXXXXXXXXXXXXXXXXXXXXXXXX
[2]  ⍝PRGM COMPUTES THE OUTPUT FEATURE SPECTRUM FOR THE FINE ADJ MODULE
[3]  ⍝OVER A PRESET RANGE OF OFFSETS.
[4]  ⍝XXXXXXXXXXXXXXXXXXXXXXXXXXXXXXXXXXXXXXXXXXXXXXXXXXXXX
[5]  ⍝TIENO= TIE NUMBER FOR INPUT FILE.
[6]  ⍝M= INPUT DIMENSION.
[7]  ⍝N= NUMBER OF HIDDEN NEURONS.
[8]  ⍝STEPS FOR ACCESSING FILE:
[9]  ⍝BEFORE RUNNING PRGM DO: 'NNFILES'⎕FTIE 2.
[10] ⍝
[11] ⍝XXXXXXXXXXXXXXXXXXXXXXXXXXXXXXXXXXX
[12] ⍝INITIALIZE SYSTEM
[13] ⍝XXXXXXXXXXXXXXXXXXXXXXXXXXXXXXXXXXX
```

```
[14] A
[15]   INITIALE
[16] A
[17] AXXXXXXXXXXXXXXXXXXXXXXXXXXXXXXXXXXX
[18] APATTERN LOOP
[19] AXXXXXXXXXXXXXXXXXXXXXXXXXXXXXXXXXXX
[20]   SH←SV←⁻3
[21] OUTERLOOP:
[22]   SH←⁻3
[23] INNERLOOP:
[24]   PATTERN←SH SHIFT SV
[25] A
[26] AXXXXXXXXXXXXXXXXXXXXXXXXXXXXXXXXXXX
[27] AFEATURE LOOP
[28] AXXXXXXXXXXXXXXXXXXXXXXXXXXXXXXXXXXX
[29]   KK←1
[30] FLOOP:
[31]   ACTIVITE
[32]   →(TK≤10)/CONTINUE
[33]   S←0
[34]   →SKIP
[35] A  □←' '
[36] A  □←'SYSTEM NOT SOLVED'
[37] A  □←'FEATURE= ',⍕KK
[38] A  →END
[39] CONTINUE:
[40]   OUTPUTE
[41] SKIP:SPECTRUM[KK;1]←S
[42]   KK←KK+1
[43]   →(KK≤4)/FLOOP
[44] APRINT RESULTS
[45]   □←' '
[46]   □←'PATTERN ='
[47]   PATTERN
[48]   □←'HORIZONTAL SHIFT= ',(⍕SH),' VERTICAL SHIFT= ',⍕SV
[49]   □←' '
[50]   □←'SPECTRUM ='
[51]   6 0 ⍕SPECTRUM
[52]   □←'NORTH  SOUTH    EAST    WEST'
[53]   SH←SH+1
[54]   →(SH≤3)/INNERLOOP
[55]   SV←SV+1
[56]   →(SV≤3)/OUTERLOOP
[57] END:

∇INITIALE[□]∇
[0]   INITIALE
[1]   AREAD DATA FROM NNFILES.ASF.
[2]    TIENO←2 AEDIT-IN CORRECT TIE NUMBER.
[3]    SYSTEM←□FREAD TIENO 5 AFINE ADJ MODULE.
[4] A
[5]    M←21
[6]    N←25
[7]   ADEFINE DETECTOR SYSTEM.
[8]    ATEMP←SYSTEM[⍳N;⍳N]
[9]    BTEMP←SYSTEM[⍳N;(N+⍳M)]
[10]   CTEMP←SYSTEM[(N+1);⍳N]
[11]   DTEMP←SYSTEM[(N+1);(N+⍳M)]
[12] A
[13]   KK←1
[14]   SPECTRUM←(4,1)⍴1

∇ACTIVITE[□]∇
[0]   ACTIVITE
[1]   APRGM COMPUTES NEURON ACTIVITY FOR FINE ADJUST.
[2]    →(KK=1)/L1
[3]    →(KK=2)/L2
[4]    →(KK=3)/L3
[5]    →(KK=4)/L4
[6] A
[7]   L1: ANORTH
```

```
[8]    TEMP←⌽PATTERN
[9]    INPUT←(M,1)ρTEMP[;ι3]
[10]   →ITERATE
[11]  ⍝
[12] L2: ⍝SOUTH
[13]   TEMP←⊖⌽PATTERN
[14]   INPUT←(M,1)ρTEMP[;ι3]
[15]   →ITERATE
[16]  ⍝
[17] L3: ⍝EAST
[18]   TEMP←⌽PATTERN
[19]   INPUT←(M,1)ρTEMP[;ι3]
[20]   →ITERATE
[21]  ⍝
[22] L4: ⍝WEST
[23]   TEMP←PATTERN
[24]   INPUT←(M,1)ρTEMP[;ι3]
[25]   →ITERATE
[26]  ⍝
[27] ITERATE:
[28]   X0←TEMP1←BTEMP+.×⌈(1⌊(0⌈INPUT))
[29]   X1←ATEMP+.×⌈(1⌊(0⌈X0))
[30]   XOLD←X0+X1
[31]   TK←0
[32] LOOP1:
[33]   TEMP2←ATEMP+.×⌈(1⌊(0⌈XOLD))
[34]   XNEW←(TEMP1+TEMP2)
[35]   DELTAX←XNEW-XOLD
[36]   MAXERROR←+/|,DELTAX
[37]   →(MAXERROR=0)/END
[38]   TK←TK+1
[39]   XOLD←XNEW
[40]   →(TK≤10)/LOOP1
[41] END:

∇OUTPUTE[□]∇
[0]   OUTPUTE
[1]   ⍝
[2]   OUT1←CTEMP+.×⌈(1⌊(0⌈XNEW))
[3]   OUT2←DTEMP+.×⌈(1⌊(0⌈INPUT))
[4]   S←OUT1+OUT2

∇SHIFT[□]∇
[0]   Z←SH SHIFT SV
[1]   ⍝PRGM SHIFTS A 7×7 PATTERN HORIZONTALLY AND/OR VERTICALLY.
[2]   ⍝SH= HORIZONTAL SHIFT: 1, 2,... (EAST); ¯1, ¯2,...(WEST).
[3]   ⍝SV= VERTICAL SHIFT:   1, 2,... (NORTH);¯1, ¯2,...(SOUTH).
[4]   ⍝CELL= A 7×7 MATRIX DEFINING THE CELL.
[5]   ⍝
[6]    TEMP1←TEMP2← 7 7 ρ0
[7]   ⍝HORIZONTAL SHIFTS:
[8]    →(SH>0)/LINE1
[9]    →(SH<0)/LINE2
[10]   TEMP1←CELL
[11]   →VERT
[12] LINE1:TEMP1[;SH↓ι7]←CELL[;ι(7-SH)]
[13]   →VERT
[14] LINE2:TEMP1[;ι(7+SH)]←CELL[;(-SH)↓ι7]
[15]   →VERT
[16] ⍝VERTICAL SHIFTS:
[17] VERT:
[18]   →(SV>0)/LINE3
[19]   →(SV<0)/LINE4
[20]   TEMP2←TEMP1
[21]   →END
[22] LINE3:TEMP2[ι(7-SV);]←TEMP1[SV↓ι7;]
[23]   →END
[24] LINE4:TEMP2[(-SV)↓ι7;]←TEMP1[ι(7+SV);]
[25]   →END
[26] END:Z←TEMP2
```

```
        ∇DESIGND[□]∇
[0]  DESIGND
[1]  Axxxxxxxxxxxxxxxxxxxxxxxxxxxxxxxxxxxxxxxxxxxxxxxxxx
[2]  APRGM DESIGNS ON-CENTER/OFF-SURROUND, MULTI-INPUT, SINGLE OUTPUT NN'S.
[ ]  Axxxxxxxxxxxxxxxxxxxxxxxxxxxxxxxxxxxxxxxxxxxxxxxxxx
[4]  AM= INPUT DIMENSION
[5]  AN= NUMBER OF HIDDEN NEURONS
[6]  A
[7]  ANPATTERN= NUMBER OF TRAINING PATTERNS
[8]  APATTERN[K;;]= INDEXED SET OF TRAINING PATTERNS
[9]  AT= TARGET SEQUENCE
[10] ATHI= TARGET SEQUENCE UPPER BOUND
[11] ATLO= TARGET SEQUENCE LOWER BOUND
[12] AD= METRIC
[13] A
[14] AL= RANGE OF INITIAL VALUES FOR A,B,C MATRIX ELEMENTS
[15] ARANGE= -L,....,0,1,....,L
[16] AP= 1/PROBABILITY OF AN ELEMENT CHANGE
[17] ANC= NUMBER OF COPIES PER GENERATION
[18] ANG= NUMBER OF GENERATIONS
[19] A
[20] AINITIALIZE           MODIFIED TO START W/ EXISTING SYSTEM
[21] A                     NG SET OUTSIDE PRGM (2-21-89)
[22] INITIALD   ← CK C.+A
[23] A
[24]   FRACTION←TRYCOUNT←SOLVECOUNT←ABORTCOUNT←0
[25]   K←1
[26] Axxxxxxxxxxxxxxxxxxxxxxxxxxxxxxxxxxxxxx
[27] A-----------GENERATION LOOP--------------
[ ]  Axxxxxxxxxxxxxxxxxxxxxxxxxxxxxxxxxxxxxx
[29] GLOOP:
[30] A
[31]   KK←1
[32] Axxxxxxxxxxxxxxxxxxxxxxxxxxxxxxxxxxxxxx
[33] A--------------COPY LOOP----------------
[34] Axxxxxxxxxxxxxxxxxxxxxxxxxxxxxxxxxxxxxx
[35] CLOOP:
[36]   MAKECOPIESD
[37] A
[38]   KKK←1
[39] Axxxxxxxxxxxxxxxxxxxxxxxxxxxxxxxxxxxxxx
[40] A------------TRAINING LOOP--------------
[41] Axxxxxxxxxxxxxxxxxxxxxxxxxxxxxxxxxxxxxx
[42] TLOOP: ATRAINING LOOP
[43]   TRYCOUNT←TRYCOUNT+1
[44]   SOLVEQU
[45] Axxxxxxxxxxxxxxxxxxxxxxxxxxxxxxxxxxxxxx
[46] A-----------TEST FOR SOLUTION-----------
[47] Axxxxxxxxxxxxxxxxxxxxxxxxxxxxxxxxxxxxxx
[48]   →(TK≤10)/CONTINUE
[49]   □←' '
[50]   □←'SYSTEM NOT SOLVED'
[51]   □←'GENERATION= ',⍕K
[52]   □←'COPY=',⍕KK
[53]   □←'PATTERN=',⍕KKK
[54]   □←'ABORTCOUNT=',⍕ABORTCOUNT
[55]   FRACTION←SOLVECOUNT÷TRYCOUNT
[56]   □←'FRACTION OF COPIES SOLVED= ',⍕FRACTION
[57]   ABORTCOUNT←ABORTCOUNT+1
[58]   →(ABORTCOUNT>20000)/END
[59]   →CLOOP
[60] CONTINUE:
[61]   SOLVECOUNT←SOLVECOUNT+1
[62]   OUTPUT
[63]   KKK←KKK+1
[64] Axxxxxxxxxxxxxxxxxxxxxxxxxxxxxxxxxxxxxx
[65] A-------------END TRAINING--------------
[66] Axxxxxxxxxxxxxxxxxxxxxxxxxxxxxxxxxxxxxx
```

```
[67]    →(KKK≤NPATTERN)/TLOOP
[68]    AxxxxxxxxxxxxxxxxxxxxxxxxxxxxxxxxxxxxxX
[69]    A-----------SELECT SURVIVOR---------------
[70]    AxxxxxxxxxxxxxxxxxxxxxxxxxxxxxxxxxxxxxX
[71]    SELECT
[72]    →(MINMETRIC=0)/END
[73]    KK←KK+1
[74]    →(KK≤NC)/CLOOP
[75]    AxxxxxxxxxxxxxxxxxxxxxxxxxxxxxxxxxxxxxX
[76]    A-------------END COPIES-----------------
[77]    AxxxxxxxxxxxxxxxxxxxxxxxxxxxxxxxxxxxxxX
[  ]    SYSTEM[ιN;ιN]←A←AMIN
[79]    SYSTEM[ιN;(N+ιM)]←B←BMIN
[80]    SYSTEM[(N+1);ιN]←C←CMIN
[81]    SYSTEM[(N+1);(N+ιM)]←D←DMIN
[82]    SYSMETRIC←MINMETRIC
[83]    ▯←' '
[84]    ▯←'GENERATION COMPLETED, NUMBER= ',⍕K
[85]    ▯←'METRIC= ',⍕SYSMETRIC
[86]    ▯←' '
[87]    GENERATIONVECTOR[K]←K
[88]    METRICVECTOR[K]←SYSMETRIC
[89]    AxxxxxxxxxxxxxxxxxxxxxxxxxxxxxxxxxxxxxX
[90]    A------------END GENERATIONS--------------
[91]    AxxxxxxxxxxxxxxxxxxxxxxxxxxxxxxxxxxxxxX
[92]    K←K+1
[93]    →(K≤NG)/GLOOP
[94]    AxxxxxxxxxxxxxxxxxxxxxxxxxxxxxxxxxxxxxX
[95]    A-----------FINAL OUTPUT-----------------
[96]    AxxxxxxxxxxxxxxxxxxxxxxxxxxxxxxxxxxxxxX
[97]    END:
[98]    SYSTEM[ιN;ιN]←A←AMIN
[94]    AxxxxxxxxxxxxxxxxxxxxxxxxxxxxxxxxxxxxxX
[95]    A-----------FINAL OUTPUT-----------------
[96]    AxxxxxxxxxxxxxxxxxxxxxxxxxxxxxxxxxxxxxX
[97]    END:
[  ]    SYSTEM[ιN;ιN]←A←AMIN
[  ]    SYSTEM[ιN;(N+ιM)]←B←BMIN
[100]   SYSTEM[(N+1);ιN]←C←CMIN
[101]   SYSTEM[(N+1);(N+ιM)]←D←DMIN
[102]   SYSMETRIC←MINMETRIC
[103]   ▯←' '
[104]   ▯←'FINAL SYSTEM: GENERATION = ',⍕K
[105]   ▯←'METRIC = ',⍕SYSMETRIC
[106]   GENERATIONVECTOR[K]←K
[107]   METRICVECTOR[K]←SYSMETRIC
[ 8]
[109]

∇INITIALD[▯]∇
[0]     INITIALD
[1]     AM←9
[2]     AN←1
        A
[4]     ANPATTERN←4
[5]     APATTERN←(NPATTERN,3,3)ρ1
[6]     A PATTERN[1;;]←HOR
[7]     A PATTERN[2;;]←DIAGUP
[8]     A PATTERN[3;;]←VER
[9]     A PATTERN[4;;]←DIAGDN
[10]    A T←5,1,0,1
[11]    A THI← 6 2 1 2
[12]    A TLO← 4 0 ¯1 0
[13]    AMETRIC←S←(NPATTERN)ρ0
[14]    ASYSMETRIC←MINMETRIC←5
[15]    M←49
[16]    N←25
[17]    NPATTERN←12
```

```
[18]  ⍝ NPATTERN←4
[19]     PATTERN←(NPATTERN,7,7)⍴1
[20]     PATTERN[1;;]←HOR1
[21]     PATTERN[2;;]←HOR2
[22]     PATTERN[3;;]←HOR3
[23]     PATTERN[4;;]←DIAGUP1
[24]     PATTERN[5;;]←DIAGUP2
[25]     PATTERN[6;;]←DIAGUP3
[26]     PATTERN[7;;]←VER1
[27]     PATTERN[8;;]←VER2
[ ]      PATTERN[9;;]←VER3
[  ]     PATTERN[10;;]←DIAGDN1
[30]     PATTERN[11;;]←DIAGDN2
[31]     PATTERN[12;;]←DIAGDN3
[32]     PASS← 4 5 6
[33]     STOP← 1 2 3 7 8 9 10 11 12
[34]     THI←50
[35]     TLO←10
[36]  ⍝ THI← 10 10 10 100 100 100 10 10 10 10 10 10
[37]  ⍝ TLO← ¯100 ¯100 ¯100 50 50 50 ¯100 ¯100 ¯100 ¯100 ¯100 ¯100
[38]  ⍝ T← 1 1 1 10 10 10 1 1 1 0 0 0
[39]  ⍝ THI← 4 4 4 20 20 20 4 4 4 4 4 4
[40]  ⍝ TLO← ¯10 ¯10 ¯10 7 7 7 ¯10 ¯10 ¯10 ¯10 ¯10 ¯10
[41]  ⍝ T← 10 1 0 1
[42]  ⍝ THI←T+3
[43]  ⍝ TLO←T-3
[44]  ⍝ M←2
[45]  ⍝ N←3
[46]  ⍝ NPATTERN←4
[47]  ⍝ PATTERN←(NPATTERN,1,2)⍴1
[48]  ⍝ PATTERN[1;;]← 1 2 ⍴ 0 0
[49]  ⍝ PATTERN[2;;]← 1 2 ⍴ 0 1
[50]  ⍝ PATTERN[3;;]← 1 2 ⍴ 1 0
[51]  ⍝ PATTERN[4;;]← 1 2 ⍴ 1 1
[52]  ⍝ T← 0 6 6 0
[  ]  ⍝ THI←T+2
[54]  ⍝ TLO←T-2
[55]  ⍝ MINMETRIC←NPATTERN
[56]     S←(NPATTERN)⍴0
[57]  ⍝
[58]     L←10
[59]     P←3
[60]     NC←10
[61]     NG←4250
[62]     SCALE←((N+1),(M+N))⍴(N⍴1),(M⍴10) ⍝SCALES ELEMENT VALUES.
[63]     METRICVECTOR←GENERATIONVECTOR←(NG+1)⍴0
[64]  ⍝
[65]  ⍝ SYSTEM←¯1+?((N+1),(N+M))⍴(L+1) ⍝CHOOSE RANDOM POS ELEMENTS
[66]     AMIN←A←-(SYSTEM[⍳N;⍳N]×~(N,N)⍴1,N⍴0) ⍝NEG SUBMATRIX WITH ZERO DIAGONAL.
[67]     BMIN←B←(10×SYSTEM[⍳N;(N+⍳M)]) ⍝POS SUBMATRIX.
[68]     CMIN←C←-((1,N)⍴SYSTEM[(N+1);⍳N]) ⍝NEG SUBMATRIX.
[69]     DMIN←D←(10×(1,M)⍴SYSTEM[(N+1);(N+⍳M)]) ⍝POS SUBMATRIX.
[70]  ⍝ SYSTEM[⍳N;⍳N]←A ⍝REVISE SYSTEM.
[71]  ⍝ SYSTEM[⍳N;(N+⍳M)]←B
[72]  ⍝ SYSTEM[(N+1);⍳N]←C ⍝REVISE SYSTEM.
[73]  ⍝ SYSTEM[(N+1);(N+⍳M)]←D
```

∇MAKECOPIESD[⎕]∇

```
[0]   MAKECOPIESD
[1]   ⍝
[2]   ⍝INPUT= SYSTEM
      ⍝OUTPUT=SYSTEMC,ACOPY,BCOPY,CCOPY,DCOPY
[4]      COLINDEX←1=?(M+N)⍴P ⍝PICK 1 OF P COLUMNS TO CHANGE.
[5]      MTEMP1←((N+1),(M+N))⍴0 ⍝DEFINE MATRIX WITH 1'S IN COLUMNS
[6]      MTEMP1←MTEMP1+((N+1),(M+N))⍴COLINDEX ⍝TO BE CHANGED & 0'S ELSEWHERE.
[7]      ⍝ SCALE←((N+1),(M+N))⍴(N⍴1),(M⍴5) ⍝SCALES ELEMENT VALUES.
[8]      MTEMP2←(¯1+?(1+MTEMP1×L))×SCALE ⍝CHOOSE NEW ELEMENT VALUES IN RANGES.
[9]      COLUMN←((N+1),(M+N))⍴(N⍴¯1),(M⍴1) ⍝MAKES A,C NEG & B,D POS.
```

```
[10]    MTEMP2←MTEMP2×COLUMN ⍝MATRIX WITH NEW VALUES.
[11]    SYSTEMC←SYSTEM×~MTEMP1 ⍝ZERO-OUT VALUES TO BE CHANGED.
[12]    SYSTEMC←SYSTEMC+MTEMP2 ⍝INSERT NEW VALUES INTO MATRIX.
[13]    ACOPY←SYSTEMC[⍳N;⍳N]×~(N,N)⍴1,N⍴0 ⍝PICK-OUT SUBMATRICES.
[14]    BCOPY←SYSTEMC[⍳N;(N+⍳M)]
[15]    CCOPY←SYSTEMC[(N+1);⍳N]
[16]    DCOPY←SYSTEMC[(N+1);(N+⍳M)]
        ∇SOLVEQU[⎕]∇
[0]     SOLVEQU
[1]     ⍝xxxxxxxxxxxxxxxxxxxxxxxxxxxxxxxxxx
[2]     ⍝SOLVES: X=Af(X)+Bf(I)
[3]     ⍝xxxxxxxxxxxxxxxxxxxxxxxxxxxxxxxxxx
[4]     ⍝xxxxxxxxxxxxxxxxxxxxxxxxxxxxxxxxxx
[5]     ⍝MAP 2D→1D
[6]     ⍝xxxxxxxxxxxxxxxxxxxxxxxxxxxxxxxxxx
[7]     INPUT←(M,1)⍴PATTERN[KKK;;]
[8]     ⍝xxxxxxxxxxxxxxxxxxxxxxxxxxxxxxxxxx
[9]     ⍝COMPUTE CONSTANT TERM
[10]    ⍝xxxxxxxxxxxxxxxxxxxxxxxxxxxxxxxxxx
[11]    X0←TEMP1←BCOPY+.×⌈(1⌊(0⌈INPUT))
[12]    X1←ACOPY+.×⌈(1⌊(0⌈X0))
[13]    XOLD←X0+X1
[14]    ⍝
[15]    TK←0
[16]    ⍝ XOLD←(ACOPY+.×(N,1)⍴1)+TEMP1
[17]    LOOP1:
[18]    TEMP2←ACOPY+.×⌈(1⌊(0⌈XOLD))
[19]    XNEW←(TEMP1+TEMP2)
[20]    DELTAX←XNEW-XOLD
[21]    ⍝xxxxxxxxxxxxxxxxxxxxxxxxxxxxxxxxxx
[22]    ⍝CONVERGENCE TEST
[23]    ⍝xxxxxxxxxxxxxxxxxxxxxxxxxxxxxxxxxx
[24]    MAXERROR←+/|,DELTAX
[25]    ⍝⎕←MAXERROR
[26]    →(MAXERROR=0)/END
[27]    ⍝
[28]    ⍝
[29]    ⍝
[30]    TK←TK+1
[31]    XOLD←XNEW
[32]    →(TK≤10)/LOOP1
[33]    END:
        ∇SOLVESYS[⎕]∇
[0]     SOLVESYS
[1]     INPUT←(M,1)⍴PATTERN[KKK;;]
[2]     X0←BCOPY+.×(STEP INPUT)
[3]     XNEW←XOLD←(N,1)⍴0
[4]     TK←1
[5]     DELTA←1÷10
[6]     LOOP:
[7]     XOLD←XNEW
[8]     XNEW←XOLD+(-XOLD+(ACOPY+.×(STEP XOLD))+X0)×DELTA
[9]     TK←TK+1
[10]    →(TK≤30)/LOOP
[11]    ⍝TEST
[12]    X1←(ACOPY+.×(STEP XNEW))+X0
[13]    X2←(ACOPY+.×(STEP X1))+X0
[14]    X3←(ACOPY+.×(STEP X2))+X0
[15]    DELTAX←X3-X2
[16]    MAXERROR←+/|,DELTAX
[17]    XNEW←X3
        ∇STEP[⎕]∇
[0]     Z←STEP X
[1]     Z←⌈(1⌊(0⌈X))
```

∇OUTPUT[□]∇
OUTPUT
   ⍝
[2]   OUT1←CCOPY+.×⌈(1⌊(0⌈XNEW))
[3]   OUT2←DCOPY+.×⌈(1⌊(0⌈INPUT))
[4]   S[KKK]←OUT1+OUT2

∇SELECT[□]∇
[0]   SELECT
[1]   ⍝METRIC
[2]   ⍝ METRIC←+/~(S=T)
[3]   ⍝ METRIC←+/~((TLO≤S)∧(S≤THI))
[4]   METRIC←(+/~THI≤S[PASS])+(+/~TLO≥S[STOP])   ← NEW METRIC
[5]   →(METRIC≥MINMETRIC)/DONE
[6]   AMIN←ACOPY
[7]   BMIN←BCOPY
[8]   CMIN←CCOPY
[9]   DMIN←DCOPY
[10]  MINMETRIC←METRIC
[11] DONE:

I claim:

1. A computer method for implementing a neural network for use in a selected application, said neural network being implemented to effect a desired relationship between inputs representing real world phenomena and outputs corresponding to the inputs, said neural network having neurons and neurons interconnections each of said neurons possibly having an interconnection to any other of said neurons, each of said interconnections characterized by an associated weight value, said weight values having potentially any value including zero, positive, or negative, the method comprising (a) by computer, searching possible sets of weight values and selecting a set of weight values for use in the neural network, said step of searching and selecting comprising (i) picking an initial set of weight values;

(ii) organizing said initial set of weight values in rows and columns, so the weight values in each of said rows all are associated with interconnections to the same one of said neurons, and the weight values in each of said columns all are associated with interconnections from the same one of said neurons;

(iii) generating successor sets of weight values from said initial set of weight values;

(iv) for each of said successor sets of weight values, determining test outputs of a neural network having those weights, when activated by predetermined inputs;

(v) analyzing the merits of each of said successor sets of weight values based on how well the test outputs conform to predetermined outputs;

(vi) selecting a single surviving set of weight values from among said successor sets of weight values based on the relative merits of said surviving set of weight values, said surviving set of weight values serving as an initial set; and (vii) if the merits of said surviving set of weight values meet a threshold, treating said surviving set of weight values as a final set of weight values; otherwise repeating steps (iii)-(vi) using said surviving set of weights as a new initial set of weight values; and (b) implementing said neural network with said final set of weight values.

2. The method of claim 1 further comprising constraining said interconnection weight values to comply with constraints that correspond to said selected application.

3. The method of claim 2 wherein said constraints include requiring that the interconnection weight values between a neuron and itself be zero.

4. The method of claim 2 wherein said constraints include requiring that the interconnection weight values leading from a given neuron all be of the same sign.

5. The method of claim 1 wherein said step of organizing said interconnection weight values comprises organizing said weight values with the interconnection weights leading to a given neuron all appearing in a single row (or a single column), and the interconnection weight values leading from a given neuron all appearing in a single column (or a single row).

6. The method of claim 5 wherein said rows and columns of interconnection weight values are organized in a number of matrices based on layers of neurons in said neural network.

7. The method of claim 6 wherein said neural network comprises a layer of input neurons, a layer of hidden neurons, and a single output neuron.

8. The method of claim 1 wherein said predetermined input comprises binary values which represent edges of an image.

9. The method of claim 1 wherein said step of generating successor sets of weight values comprises applying a genetic algorithm operator to said initial set of weight values.

10. The method of claim 9 wherein said step of applying a genetic algorithm operator comprises applying a mutation operator.

11. The method of claim 10 wherein applying said mutation operator comprises randomly changing a portion of said interconnection weight values.

12. The method of claim 1 wherein said step of analyzing the relative merits of the successor sets of weight values comprises computing a metric corresponding to the difference between said test outputs and said predetermined outputs.

13. The method of claim 12 wherein said step of selecting a surviving matrix comprises testing whether said metric lies within a band between upper and lower bounds.

14. The method of claim 12 wherein said step of selecting a surviving matrix comprises testing whether said metric lies above a passband or below a stop band.

15. The method of claim 1 wherein said predetermined input comprises gray gradient values which represent edges of an image.

* * * * *